United States Patent [19]
Koyama et al.

[11] Patent Number: 5,673,241
[45] Date of Patent: Sep. 30, 1997

[54] FOCUS DETECTION MECHANISM AND OPTICAL HEAD AND OPTICAL STORAGE DEVICE THAT USE IT

[75] Inventors: Fumio Koyama; Masatoshi Yonekubo; Takashi Takeda; Toshio Arimura; Hidefumi Sakata; Osamu Yokoyama, all of Suwa, Japan

[73] Assignee: Seiko Epson Corporation, Tokyo, Japan

[21] Appl. No.: 641,119

[22] Filed: Apr. 29, 1996

Related U.S. Application Data

[63] Continuation of Ser. No. 87,681, filed as PCT/JP92/01441, Nov. 6, 1992, abandoned.

[30] Foreign Application Priority Data

| Nov. 8, 1991 | [JP] | Japan | 3-293329 |
| Dec. 19, 1991 | [JP] | Japan | 3-337245 |
| Apr. 7, 1992 | [JP] | Japan | 4-85541 |

[51] Int. Cl.$^6$ ............................................. G11B 7/09
[52] U.S. Cl. ........... 369/44.23; 369/112; 369/44.41; 369/44.42; 369/103
[58] Field of Search ............ 369/44.23, 112, 369/110, 109, 44.37, 44.41, 44.42, 44.12, 103

[56] References Cited

U.S. PATENT DOCUMENTS

| 3,651,281 | 3/1972 | Becker | 360/59 |
| 4,794,585 | 12/1988 | Lee | 369/112 |
| 4,942,583 | 7/1990 | Nazarathy et al. | 372/20 |
| 4,945,529 | 7/1990 | Ono et al. | 369/109 |
| 5,270,996 | 12/1993 | Ono | 369/44.23 X |
| 5,436,876 | 7/1995 | Yokoyama et al. | 369/44.23 |

FOREIGN PATENT DOCUMENTS

| 62-154623 | 7/1987 | Japan. |
| 179237 | 7/1989 | Japan. |
| 2-199632 | 8/1990 | Japan. |
| 3-132924 | 6/1991 | Japan. |
| 212742 | 8/1992 | Japan. |

OTHER PUBLICATIONS

Proc. Int. Symp. on Optical Memory, No Month 1987; Japanese Journal of Applied Physics, vol. 26 (1987) Supplement 26-4; "A Multi-Functional Reflection Type Grating Lens for the CD Optical Head" by Kenji Tatsumi, Tadashi Matsushita, and Syo Ito; Mitsubishi Electric Corporation, 5-1-1 Ofuna, Kamakura City 247, Japan, pp. 127-130.

*Primary Examiner*—Thang V. Tran
*Attorney, Agent, or Firm*—Mark P. Watson

[57] ABSTRACT

The focus detection mechanism of the invention diffracts the return light reflected off target surface by means of holographic element. The diffracted beams are both received by two long photodetection means as two astigmatic convergent beams that forms circles of least confusion on the same plane near focal plane of a lens. The focus detection signal is obtained from differential output of them. Since the mechanism can form two diffracted beams having circles of least confusion on the same plane, the photodetection means for detection can be disposed side by side, thus simplifying production with increased dimensional accuracy. Also, although a holographic element is used, wavelength fluctuation can be absorbed to provide extremely high reliability.

37 Claims, 23 Drawing Sheets

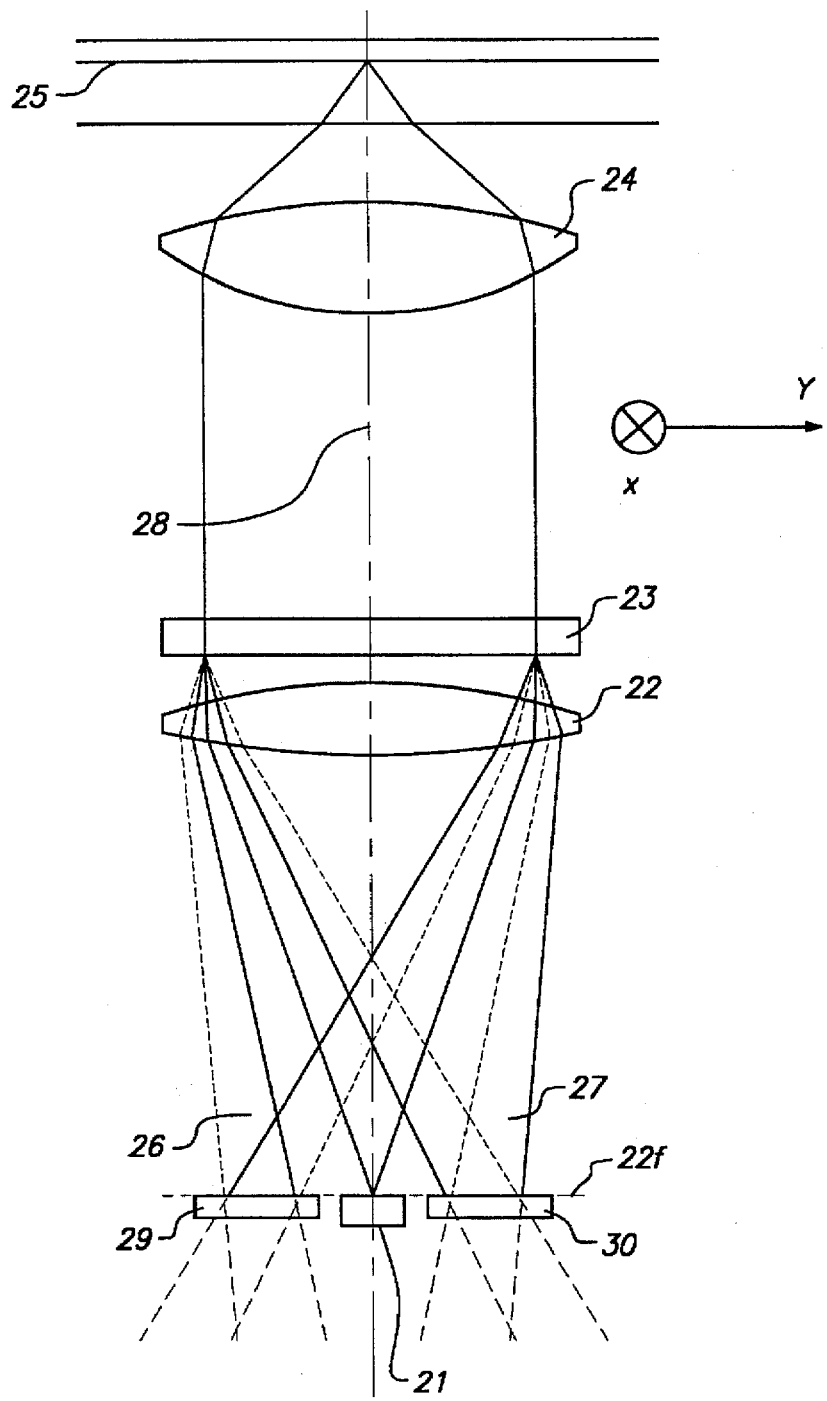
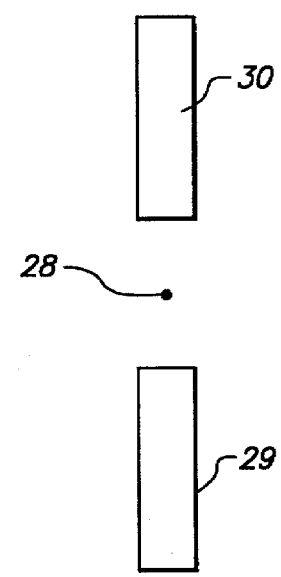
FIG. 5
FIG. 4

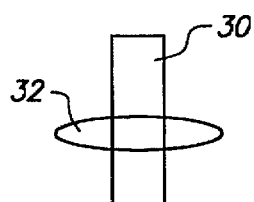 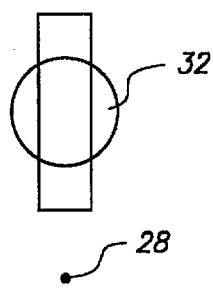 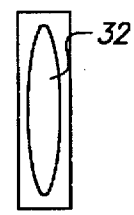
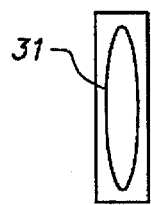 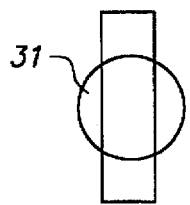 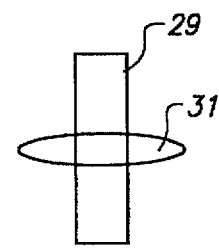
FIG. 6a  FIG. 6b  FIG. 6c
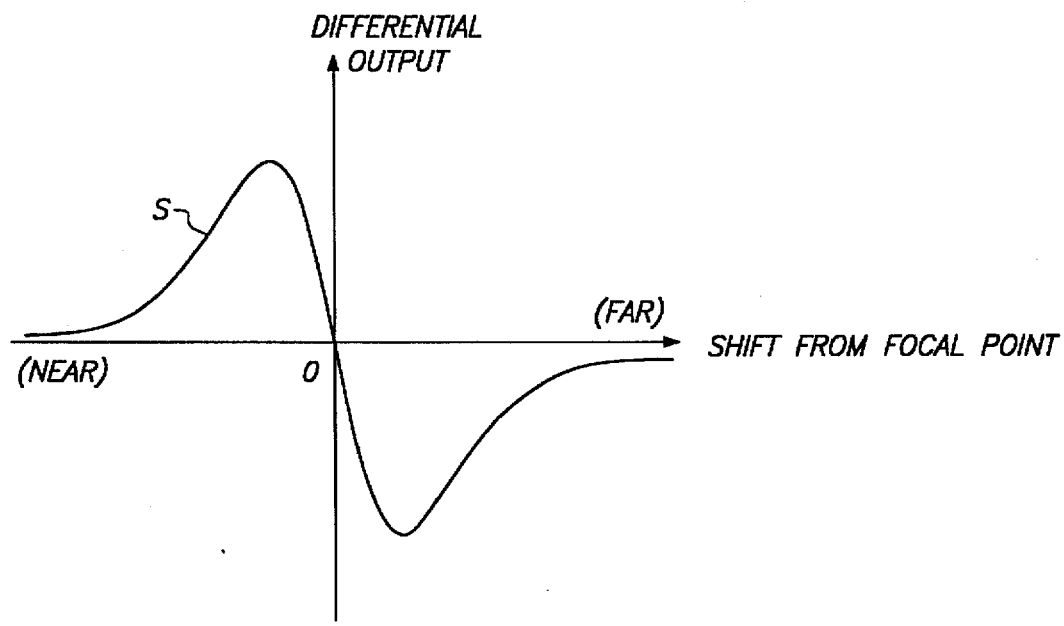
FIG. 7

FOCUS DETECTION MECHANISM AND OPTICAL HEAD AND OPTICAL STORAGE DEVICE THAT USE IT

This is a Continuation of application Ser. No. 08/087,681 filed as PCT/JP92/01441, Nov. 6, 1992, now abandoned.

BACKGROUND OF THE INVENTION

The invention relates to a focus detection mechanism suitable for detecting the focus of a beam on a target surface of an optical storage and to the optical head device and the optical storage apparatus using that mechanism.

In an optical storage apparatus that forms and/or detects tiny pits, it is essential that the beam emitted from the light source be converged on an extremely small spot on the target surface. To do this, a focus detection mechanism that utilizes return light reflected off the target surface is generally necessary. So, there is strong demand for a focus detection mechanism that is of high performance and can be effectively utilized on the optical head in order to make the optical storage apparatus compact. Thus, various systems that utilize a holographic element, for example, have been proposed.

One of these proposed systems is shown in FIG. 31. This system utilizes linear diffraction grating 5 engraved in unequal intervals. It can perform focus detection and obtain the playback signal and various error signals required for an optical storage apparatus.

In FIG. 31, return light reflected off the target surface is made a nearly parallel beam by objective lens 6 and is split into a 0-order beam and ±1-order diffracted beams by unequal-interval diffraction grating 5. Here, the engraved intervals of diffraction grating 5 are set appropriately. −1-order beam 7 is converged only in the grating array direction (y) while ±1-order beam 8, which is produced simultaneously, is diverged only in the y direction. These beams are converged by subsequent collimator 9, whereby diffracted beams 7 and 8 are converged in the y direction before and behind, respectively focal plane 9f of collimator 9 while being converged on intrinsic focal plane 9f of collimator 9 in the engraved direction (x) on which diffraction grating 5 has no effect. As a result, they become astigmatic convergent beams that form circles of least confusion before and behind, respectively, focal plane 9f of collimator 9.

Before or behind the focal point, the target surface-reflected light leaving objective lens 6 converges or diverges from the parallel beam of the in-focus condition, and thus the position of convergence of the beam moves back or forth. As a result, the shapes of the light spots projected on the two photoelectric conversion elements 10 and 11 complementarily change between a longitudinal ellipse and lateral ellipse. As shown, photoelectric conversion elements 10 and 11 are disposed at different levels at the respective positions of the circles of least confusion of the ±1-order beams and have appropriately shaped light-intercepting surfaces. Thus, a focusing error signal is obtained as the differential output of elements 10 and 11.

This method of using deformation of an astigmatic spot for focus detection is twice as sensitive as the so-called spot size method which simply detects fuzziness of the spot without using astigmatism. Because the production tolerances can be greatly relaxed, it is superior to the so-called knife-edge method, in which the detector must be precisely lined up with the conjugate position of the focusing target surface. Therefore, the superior focus detection method using these astigmatic spots is desired.

However, with linear diffraction grating 5 engraved in unequal intervals as described above, it is necessary to dispose two detectors 10 and 11 at different levels and to strictly control the dimension between them. Thus, the production requires a rather high level mounting technique. Also, deviations in the wavelength of the light source cause movement of the positions of the circles of least confusion, resulting in deviations in the detection signal.

A purpose of the invention is to solve the above problems. The invention provides a focus detection mechanism, an optical head device and an optical storage apparatus incorporating that mechanism in which the detectors can be disposed on the same plane. Thus, good focus detection is possible and wavelength deviations in the light source do not cause a problem. Also, the production is simple.

SUMMARY OF THE INVENTION

To achieve the above purpose, the focus detection mechanism of the invention comprises detection optical system that converges the return light reflected off the focusing target plane.

A holographic element is disposed in the detection optical system, and a pair of photodetection means are disposed on roughly the same plane conjugate with the target plane through detection optical system. The lengthwise direction of the photodetection means is arranged in roughly the direction of diffraction of the holographic element. The holographic element has a periodic light modulatory pattern roughly same in phase along a group of hyperbolae or modified hyperbolae. The pair of astigmatic diffracted beams diffracted by the holographic element have cross sectional shapes that change complementarily and are detected by the pair of photodetection means. Focusing on the target plane is detected by calculating the difference in the outputs of the pair of photodetection means.

Another embodiment of the invention comprises detection optical system that converges the return light reflected off the focusing target plane.

A holographic element is disposed in the detection optical system, and a pair of photodetection means are disposed on roughly the same plane conjugate with the target plane through detection optical system. The lengthwise direction of the photodetection means is arranged in roughly the direction of diffraction of the holographic element. The holographic element is divided into two areas, each of which has a periodic light modulatory pattern roughly same in phase along a group of hyperbolae or modified hyperbolae. The astigmatic diffracted beams diffracted by the different areas of the holographic element are separated from each other. The pair of astigmatic diffracted beams diffracted by the different areas of the holographic element have cross sectional shapes that change complementarily and are detected by the pair of photodetection means. Focusing on the target surface is detected by calculating the difference in the outputs of the pair of photodetection means.

The optical head of the invention comprises detection optical system that converges the return light of the playback or record beam reflected off the optical storage medium. A holographic element is disposed in the detection optical system. A pair of groups of photodetection means are disposed on roughly the same plane conjugate with the target plane through detection optical system. Each group of photodetection means comprises two photodetection means. The lengthwise directions of the photodetection means are arranged in roughly the directions of diffraction of the holographic element. The holographic element is divided into two areas by a dividing line corresponding to the tangential direction of the track on the optical storage medium surface. Each area has a periodic light modulatory pattern roughly same in phase along a group of hyperbolae or modified hyperbolae. The astigmatic diffracted beams diffracted by the different areas of the holographic element are separated from each other. The beam group made up of two the astigmatic diffracted beams from the different areas of the holographic element and whose beam cross sectional shapes change with the same trend is defined as an astigmatic diffracted beam group. The pair of astigmatic diffracted beam groups whose beam cross sectional shapes change complementarily are detected by the pair of groups of photodetection means. Focusing on the target surface is detected by obtaining the output sums of each of the photodetection means in the same groups and calculating the difference in the pair of the output sums. The two astigmatic diffracted beams diffracted from the same area of the holographic element are detected by the photodetection means in the different groups and the two sums are obtained. The difference between the detection sums is calculated, whereby the tracking error of the optical beam is detected.

Another embodiment of the optical head of the invention comprises detection optical system that converges the return light of the playback or record beam reflected off the optical storage medium. A holographic element is disposed in the detection optical system. A pair of groups of photodetection means are disposed on roughly the same plane conjugate with the target plane through detection optical system. The lengthwise directions of the photodetection means are arranged in roughly the directions of diffraction of the holographic element. The holographic element is divided up into two areas by a dividing line corresponding to the tangential direction of the track on the optical storage medium surface. Each area has a periodic light modulatory pattern roughly same in phase along a group of hyperbolae or modified hyperbolae and has undergone blaze-of-grating. The astigmatic diffracted beams diffracted by the different areas of the holographic element are separated from each other. The pair of astigmatic diffracted beams diffracted by the different areas of the holographic element have cross sectional shapes that change complementary, and are detected by the pair of photodetection means. The detection means comprises a long photodetection element and another photodetection element surrounding at least part of the photodetection element. Focusing on the target plane is detected by obtaining the output difference between the output of the long photodetection element and the output of the other photodetection element and calculating the difference in the output differences. The tracking error is detected by calculating the difference in the outputs of the pair of long photodetection means.

The optical storage apparatus of the invention comprises the above optical head which irradiates the playback or record beam on the optical storage medium, a focusing means that focuses based on the focus detection results of the optical head, and a tracking means that adjusts tracking based on the detection results for tracking error by optical head.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 4 is a principal cross section of the focus detection mechanism of the first embodiment of the invention.

FIG. 5 is an explanatory diagram of the photoelectric conversion elements in the focus detection mechanism of the first embodiment.

FIGS. 6(a-c) are diagrams for explaining the operation of the focus detection mechanism of the first embodiment.

FIG. 7 is a graph of the focusing error signal generated by the focus detection mechanism of the first embodiment.

DESCRIPTION OF THE PREFERRED EMBODIMENTS

Figure 1:
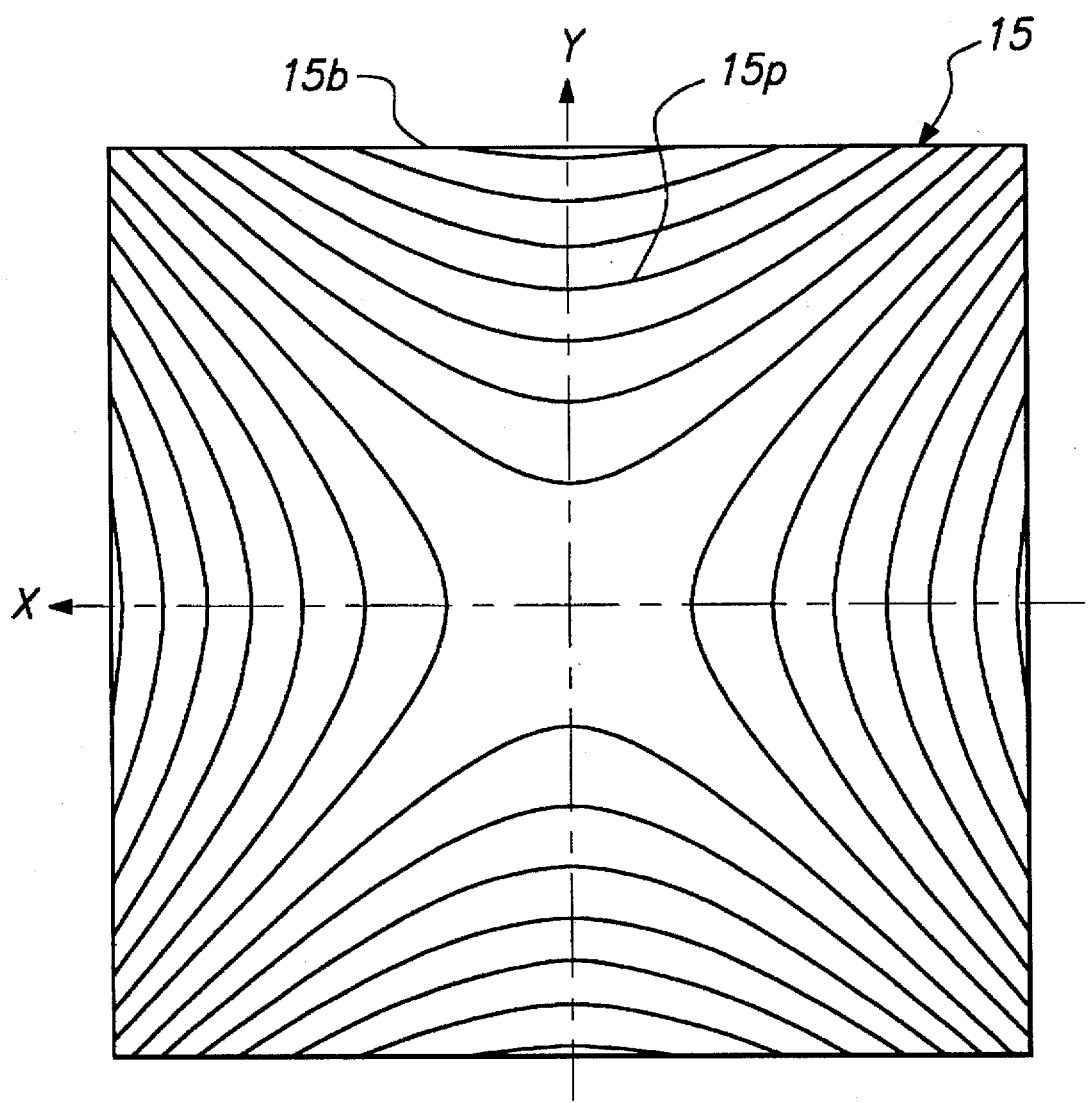
FIG. 1 shows a suitable holographic pattern used in the invention.

In the embodiments of the invention shown in FIGS. 1 to 30, the same reference numerals represent the same functional parts.

First Embodiment

FIGS. 1 to 8 show the first embodiment of the invention. FIG. 1 is an explanatory diagram of a hologram 15 suitable for use in the focus detection mechanism of the invention. Pattern 15p on nearly flat glass substrate 15b is formed such that it has the same light modulation rate of amplitude and phase, i.e., the same transmissivity and thickness or refractive index along a group of hyperbolae expressed by the equation $$x^2 - y^2 = \pm c^2$$

where c is a constant, using rectangular coordinates on a substrate surface. Further, these hyperbolic patterns 15p have a periodic pattern structure that repeats the same light modulation factor each time the value of n in $$c^2 = (f + n \cdot \lambda)^2 - f^2$$

is changed by 1, where f and $\lambda$ are constant values. For example, that part on the holographic surface following the hyperbola $$\pm(x^2 - y^2) = (f + \lambda)^2 - f^2$$

and that part following the hyperbola $$\pm(x^2 - y^2) = (f + 2\lambda)^2 - f^2$$

have the same light modulation factor of amplitude and phase and prove to be mutually in phase in the periodic structure.

In order to form pattern 15p, for example, the common method for preparing a synthesized hologram can be used. In this method, a photo-sensitive material coating on glass substrate 15b is exposed via a mask of the desired pattern and then substrate 15b is etched after development.

Figure 2A:
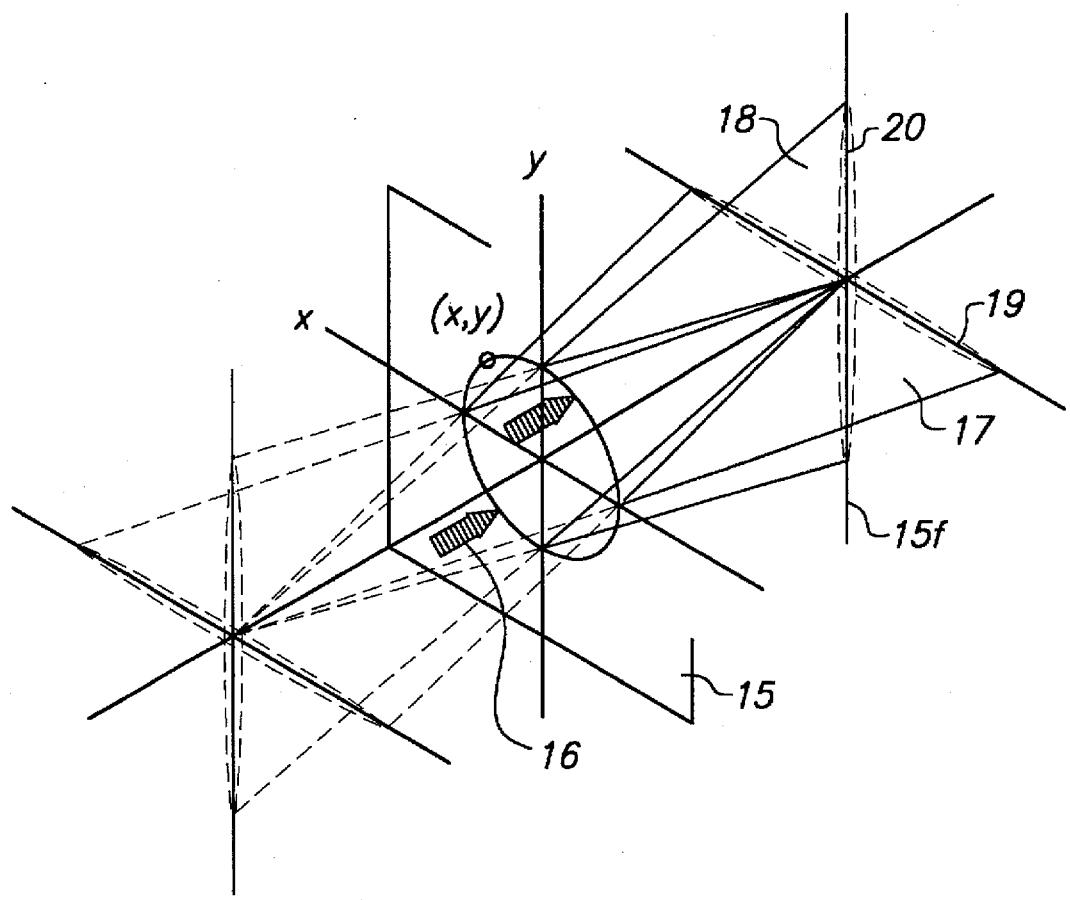
FIGS. 2(a-b) are explanatory diagrams showing diffraction by the hologram.
Figure 2B:
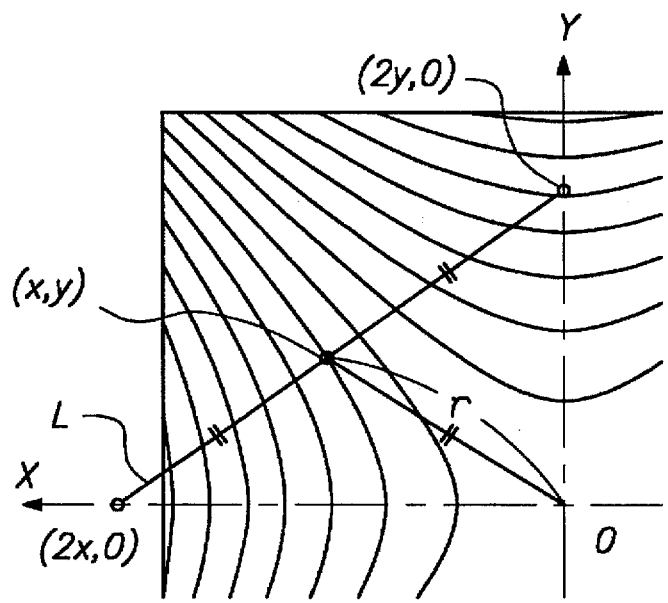

FIGS. 2(a) and 2(b) are explanatory diagrams showing diffraction by hologram 15. As shown in FIG. 2(a), when a parallel beam 16 is perpendicularly incident on hologram 15, the light particle incident at point (x, y) is diffracted in the array direction of pattern 15p at this part. In FIG. 2(b), the slope of the tangent line of the hyperbola at (x, y) is $$dy/dx = x/y$$

and the array direction of pattern 15p is orthogonal to this. Therefore, when the diffracted beam is projected on the x-y plane, line L having slope $$dy/dx = -y/x$$

results. As can be seen from FIG. 2(b), the distances measured from point (x, y) to the x and y axes along line L are equal to each other and are also equal to the distance r from point (x,y) to the origin (0, 0). The interval D of the pattern period at (x, y) is calculated as $$D = \lambda \cdot (f + n \cdot \lambda)/r$$

Therefore, when hologram 15 is irradiated with parallel beam 16 of wavelength $\lambda$, the diffraction angle $\pm\theta$ of the $\pm1$-order beams with respect to the light entering point (x, y) satisfies $$\sin \theta = r/(f + n \cdot \lambda)$$

Since f is sufficiently large compared to $n \cdot \lambda$, diffracted beams 17 and 18 come very near (2x, 0) on the x axis and (0, 2y) on the y axis on a plane separated distance f from the hologram plane in the z direction. The above explanation is valid for all points (x, y) on the hologram plane. The diffracted light generated here becomes $-1$-order beam 17, which converges at focal length f in the y direction while diverging at focal length $-f$ in the x direction, and $+1$-order beam 18, which converges at focal length f in the x direction while diverging at focal length $-f$ in the y direction. In other words, linear diffraction patterns 19 and 20 superposed on the x and y axes are obtained on focal plane 15f at distance f. This kind of hologram 15 contracts and expands its front and back focal lengths f by the same amount with wavelength fluctuations of the light source.

When pattern 15p follows the hyperbolic equation perfectly, the appearance of aberration due to paraxial shift cannot be avoided. This aberration does not present a problem in practice, but in order to correct it, a suitable modification term may be added to the equation, or the amplitude or phase modulation rate can be adjusted, or substrate 15b can be curved. In this case, the necessary modification is only slight and the pattern that realizes the above does not greatly change from the hyperbola.

Figure 3A:
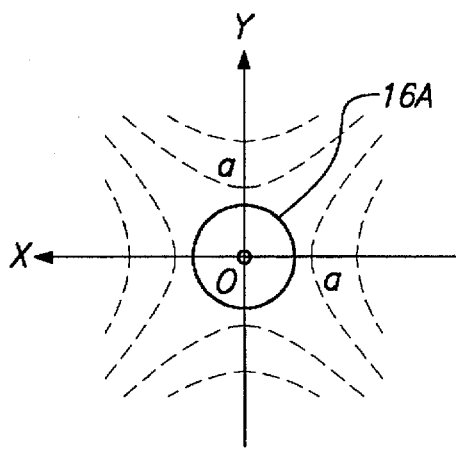
FIGS. 3(a-f) are another explanatory diagram showing the details of diffraction by the hologram.
Figure 3B:
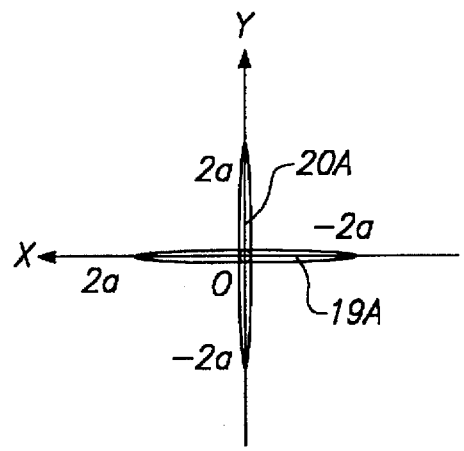
Figure 3C:
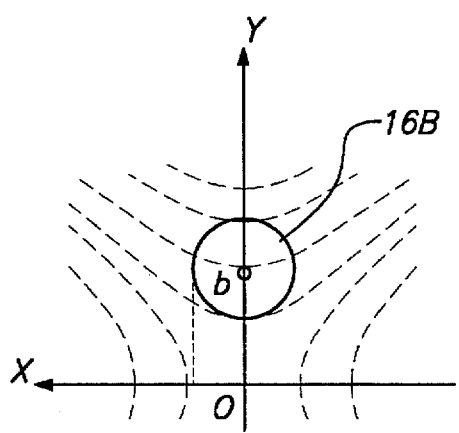
Figure 3D:
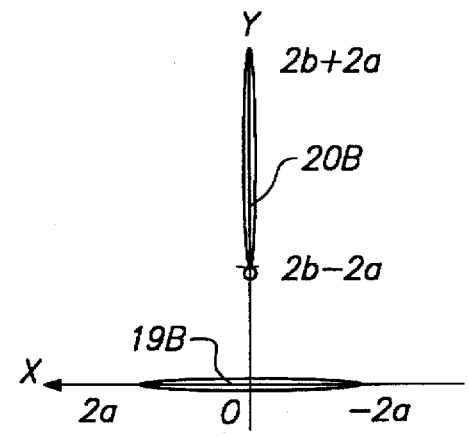
Figure 3E:
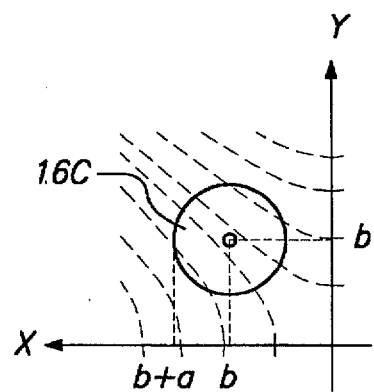
Figure 3F:
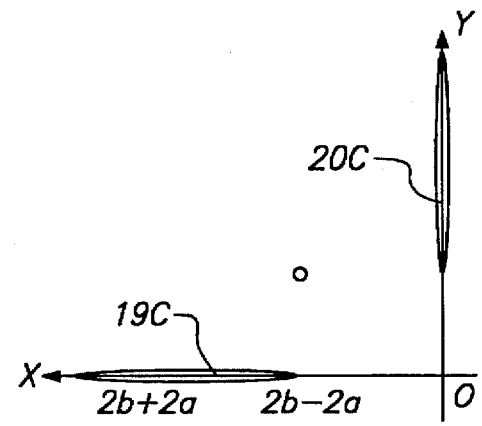

When parallel beam 16 incident on the hologram plane has a finite diameter, the range of the emitted light can be restricted. For example, as shown in FIG. 3(a), when the incident light is finite beam 16A of diameter 2a centered on the hyperbola origin (0, 0), diffraction patterns 19A, 20A of $\pm1$-order beams form a cross made up of the two linear parts $-2a \leq x \leq 2a$ on the x axis and $-2a \leq y \leq 2a$ on the y axis as shown in FIG. 3(b). Also, when beam 16B of diameter 2a is incident with its center at (0, b), which is shifted from the center axis of the hyperbola as shown in FIG. 3(c), $\pm1$-order diffraction patterns 19B, 20B become the two linear parts $-2a \leq x \leq 2a$ on the x axis and $2b-2a \leq y \leq 2b+2a$ on the y axis as shown in FIG. 3(d). If b is selected so that |b|>a, the two parts are separated. Further, when beam 16C is incident with its center at (b, b) as shown in FIG. 3(e), pattern 19C on the x axis moves distance 2b as shown in FIG. 3(f). Thus, the holographic element need not necessarily include the origin (0, 0) of the hyperbola within the substrate range. Furthermore, in separating the beams, only a part of the off-axis pattern should be used corresponding to the incident range of the beam of finite diameter.

As is known, in regard to regular synthesized holograms, a suitable holographic element for a particular application can be obtained by appropriately setting the light modulation rate of the amplitude and phase in one period, increasing or decreasing the intensity of light of a specific order of diffracted light and/or changing the light intensity distribution of each order of diffracted light, etc.

For example, as is well known, by using a blaze-of-grating technique that changes the light modulation rate of one period of the holographic element to a saw-tooth function shape, a holographic element can be obtained in which the intensity of only the −1-order beam, for example, is increased and the intensity of other order beams is nearly eliminated. Also, by selecting the blaze angle, the relative intensity of the +1-order beam and 0-order beam can be set as desired.

Further, when the slope of an asymptote common to the group of hyperbolae is changed from $$dy/dx=\pm 1$$

described above, the absolute value of the front and back focal length can be changed. For example, if the hyperbolic group has an asymptote of slope $$dy/dx=\pm 2$$

two beams can be generated, where one is a beam having focal lengths +f' and −4f' in the x and y directions, respectively, and another is a beam having focal lengths −f' and +4f', respectively.

In the following explanation, a diffracted beam that converges in the principal diffraction direction while diverging in the direction orthogonal to this and a diffracted beam that diverges in the principal diffraction direction while converging in the direction orthogonal to this are distinguished by referring to them as −1-order beam and +1-order beam, respectively, as described above.

FIG. 4 is a layout diagram showing an exemplary configuration of a focus detection mechanism that uses a holographic element such as that described above. The divergent beam from semiconductor laser 21 is made a parallel beam by collimator 22 and then arrives at holographic element 23 disposed immediately after collimator 22. Here, holographic element 23 has a hyperbolic pattern with the above asymptote of slope ±1. As in the case of FIG. 3 (c), it is an off-axis pattern whose incident optical axis passes through a position displaced from the origin of the hyperbolic group in the y direction. Therefore, ±1-order diffracted beams both diffuse from the optical axis. Only the direct advancing 0-order beam passes through objective lens 24 disposed at an appropriate distance and forms the record/playback beam converged onto optical storage medium surface 25. The return light of the incident beam reflected off medium surface 25 becomes divergent light as it travels back and is made a roughly parallel beam by objective lens 24. The return light arrives again at holographic element 23 and is diffracted. Since collimator 22 is disposed immediately after holographic element 23 on the return path, ±1-order diffracted beams 26 and 27 are both converged by collimator 22. In order to receive ±1-order diffracted beams 26 and 27, rectangular photoelectric conversion elements 29 and 30 are disposed on focal plane 22f of collimator 22 with their lengthwise direction parallel to the radial direction of optical axis 28 as shown in FIG. 5.

Here, when the distance Δ between collimator 22 and holographic element 23 is sufficiently small, the beam of focal length ± entering collimator 22 converges before the focal length F of collimator 22 by distance α, which satisfies $$1/(F-\alpha)=1/F+1/f$$

Therefore, the focal lines of −1-order diffracted beam 26, which enters the collimator as diverging at −f in the x direction while converging at +f in the y direction, come together after distance α in the x direction and before distance α in the y direction. The focal lines of another +1-order diffracted beam 27 come together before distance α in the x direction and after distance α in the y direction. Thus, diffracted beams 26 and 27 become astigmatic convergent beams that form circles of least confusion on the same plane near focal plane 22f of collimator 22. As described above, the front and back focal lengths of diffracted beams 26 and 27 incident on collimator 22 expand and contract by the same amount with fluctuations in the wavelength of the light source. Therefore, there is almost no movement in the position of the circles of least confusion. The diffraction angle of ±1-order diffracted beams 26 and 27 will sometimes change with the fluctuation in wavelength, which is accompanied by movement of the position of incidence on photoelectric conversion elements 29 and 30 in the radial direction. However, since photoelectric conversion elements 29 and 30 are long in the radial direction, this movement has no effect on the output.

Before and behind the focal point, the reflected light that passes through objective lens 24 either converges or diverges from the parallel beam of the in-focus condition. In other words, when medium surface 25 is closer than the focal point of objective lens 24, the beam diverges, and when it is farther, the beam converges. Therefore, the position of convergence of the beam on the image side of collimator 22 is farther when medium 25 is close and closer when medium is far. As a result, as shown in FIG. 6, the shapes of light spots 31 and 32 projected on rectangular photoelectric conversion elements 29 and 30 change complementarily. Their shapes change to a longitudinally long ellipse for −1-order spot 31 and a laterally long ellipse for +1-order spot 32 as shown in (a) when medium 25 is close, to both circles of least confusion as shown in (b) when in focus, and to a laterally long ellipse for −1-order spot 31 and a longitudinally long ellipse for +1-order spot 32 as shown in (c) when medium 25 is far. Since the photoelectric conversion output is large for a longitudinally long ellipse whose major axis lines up with the long sides of photoelectric conversion elements 29 and 30, a focusing error signal S like that shown in FIG. 7 is obtained by taking the differential output of photoelectric conversion element 29 on the −1-order side and photoelectric conversion element 30 on the +1-order side. By driving an actuator that adjusts the position of objective lens 24 back and forth so that the signal becomes a constant value, the record/playback beam can be continually converged onto medium surface 25.

In order to achieve this, there are well-known methods in which a differential signal of the obtained error signal and the target control value is used as the drive signal for the actuator after suitable phase compensation as required is provided.

As described above, in this embodiment, the two photoelectric conversion elements 29 and 30 for obtaining the differential output can be placed side by side in the same plane. Therefore, there is no need to strictly control the alignment of different levels, which greatly simplifies the production of the element, particularly the composite elements including both the photoelectric conversion elements and the semiconductor laser in one package. Also, since changes in the diffraction angle due to wavelength fluctuations are compensated by long photoelectric conversion elements 29 and 30 and the positions of the focal lines move back and forth nearly by the same amounts, the differential center does not shift. Therefore, even when a semiconductor laser or other light source whose emitted light wavelength readily changes is used, it is still possible to take the full advantage of the features of the hologram.

In this embodiment, when the medium is close and when it is far, the output difference can be increased or decreased by changing the width of the short sides of rectangular photoelectric conversion elements 29 and 30. In other words, the smaller the width of the short sides is, the smaller the output becomes when light spots 31 and 32 become laterally long ellipses. However, since the amount of light received during focusing also decreases as a result and the elements become susceptible to noise, a suitable value should be selected depending on the actual application.

Figure 8:
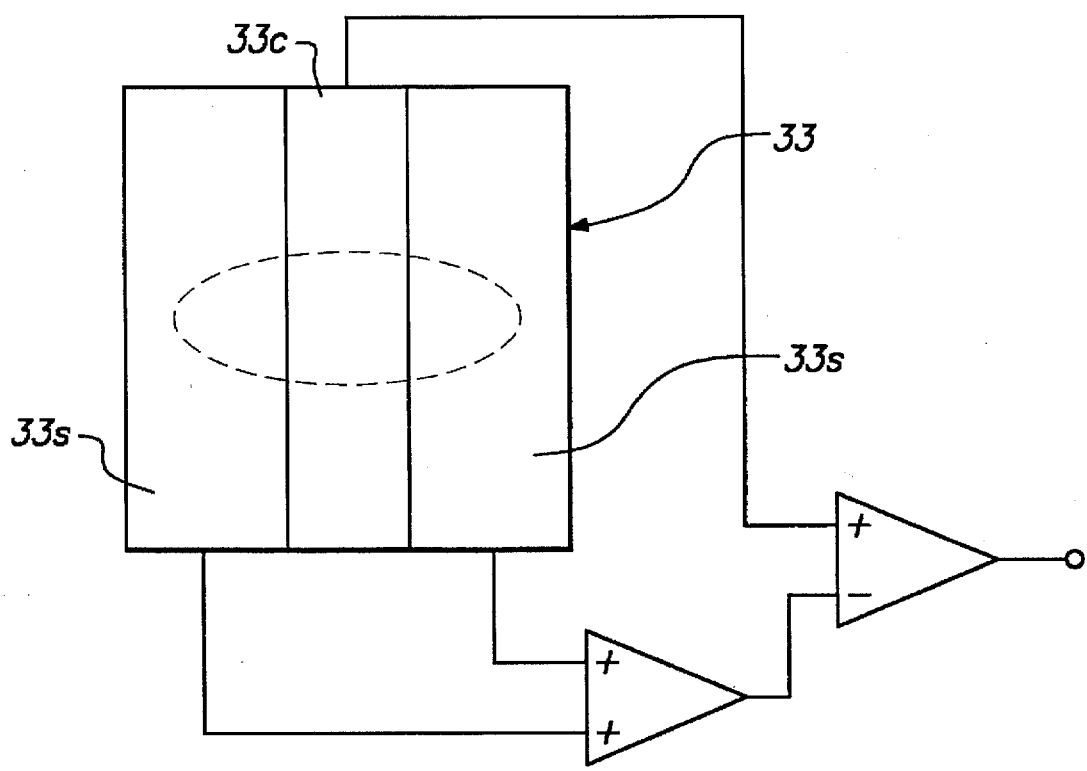
FIG. 8 is a front view of another configuration of the photoelectric conversion elements in the focus detection mechanism of the first embodiment.

The shape of photoelectric conversion elements 29 and 30 is not limited to a rectangle and it may an ellipse-like shape as long as it is long. For example, the shape of photoelectric conversion elements 29 and 30 themselves can be rectangular. Alternatively, the light receiving area may be limited to a suitable shape by putting a mask on the front surface of the photoelectric conversion elements. Further, as shown in FIG. 8, split element 33 having long middle area 33c in line with the direction of diffraction and peripheral areas 33s on either side of the middle area can be used. Also, the output difference of middle area 33c and peripheral areas 33s can be used instead of the output of photoelectric conversion elements 29 and 30. This configuration is sometimes desirable since it can be used to effectively detect the peripheral light when light spots 31 and 32 are laterally elliptic. Peripheral areas 33s can be disposed on either side of middle area 33c as shown in the figure with their outputs being added. Alternatively, they can be disposed such that they surround middle area 33c.

The focus detection mechanism of the invention is not only applicable to the optical storage apparatus described above, but it also offers compact, high-performance detection for use by optical probe type measuring devices that require a similar high-performance focusing servo and by devices such as AFMs (Atomic Force Microscope) that will optically detect cantilever movement.

Second Embodiment

Figure 9A:
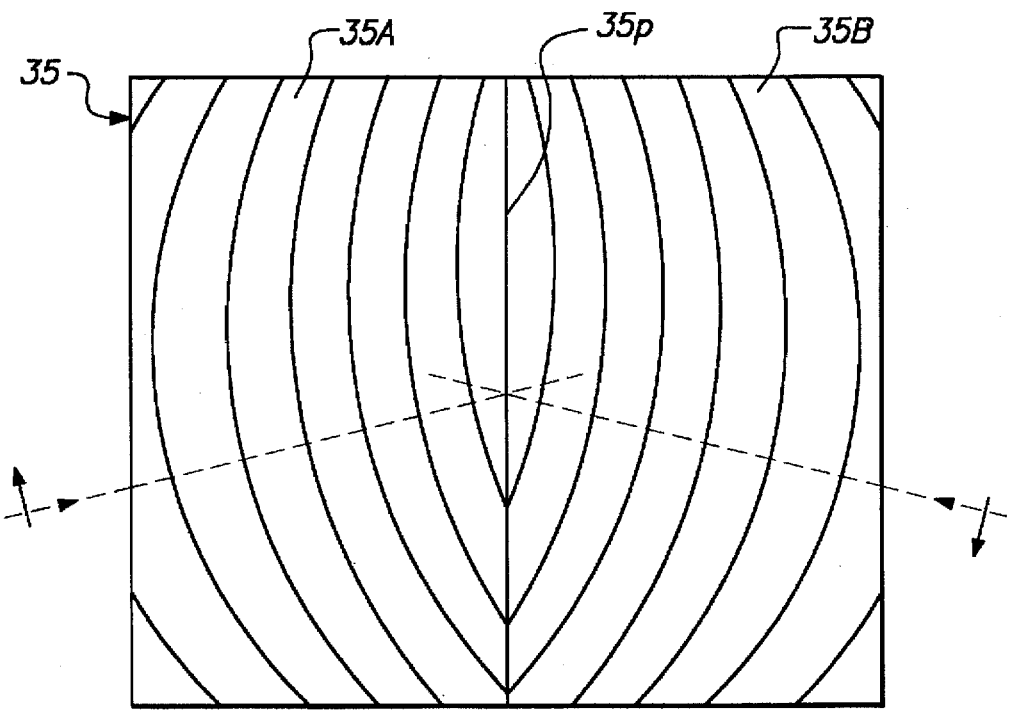
FIGS. 9(a-b) are an explanatory diagram of the holographic element of the optical head of the second embodiment of the invention.
Figure 9B:
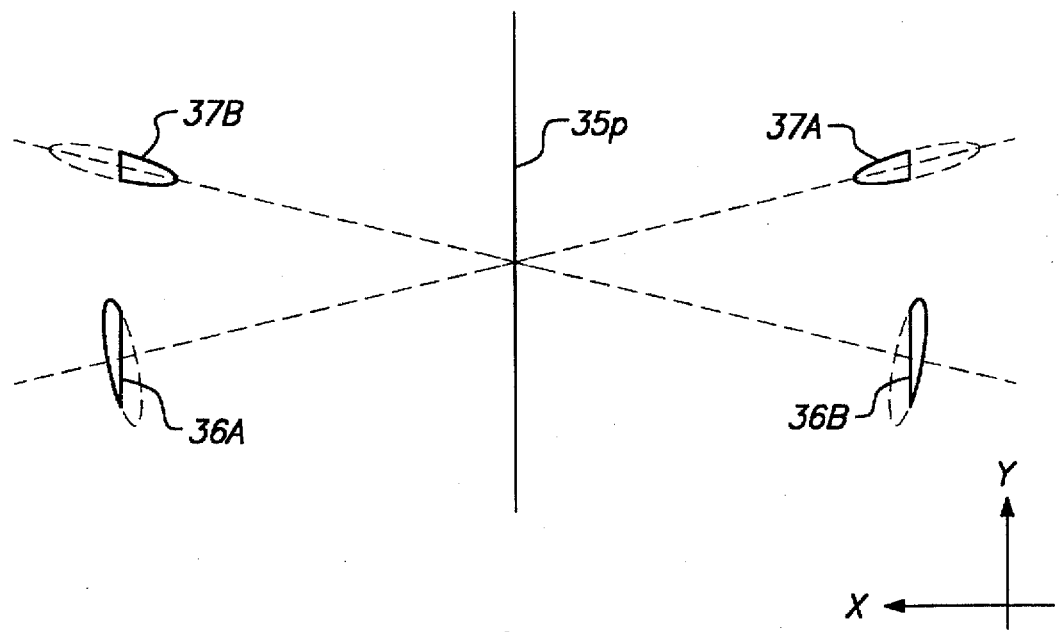

FIGS. 9 to 14 show the second embodiment of the invention. In FIG. 9, holographic element 35 comprises two symmetrical areas 35A and 35B which are symmetric about dividing line 35p as shown in FIG. 9(a). In these homologous areas 35A and 35B, are formed the hyperbolic patterns described above, particularly such off-axis patterns displaced in the y direction from the hyperbolic origin, as shown in FIG. 3(c); e.g., the left half of an off-axis pattern turned 80 degrees clockwise is depicted in left half area 35A, while the right half of the same off-axis pattern turned 80 degree counterclockwise is depicted in right half area 35B. Therefore, when a parallel beam enters and extends over both left and right areas 35A and 35B, a total of four beams 36A, 36B, 37A and 37B, is generated on straight lines inclined ±80 degrees with respect to dividing line 35p as shown in FIG. 9(b).

Figure 10:
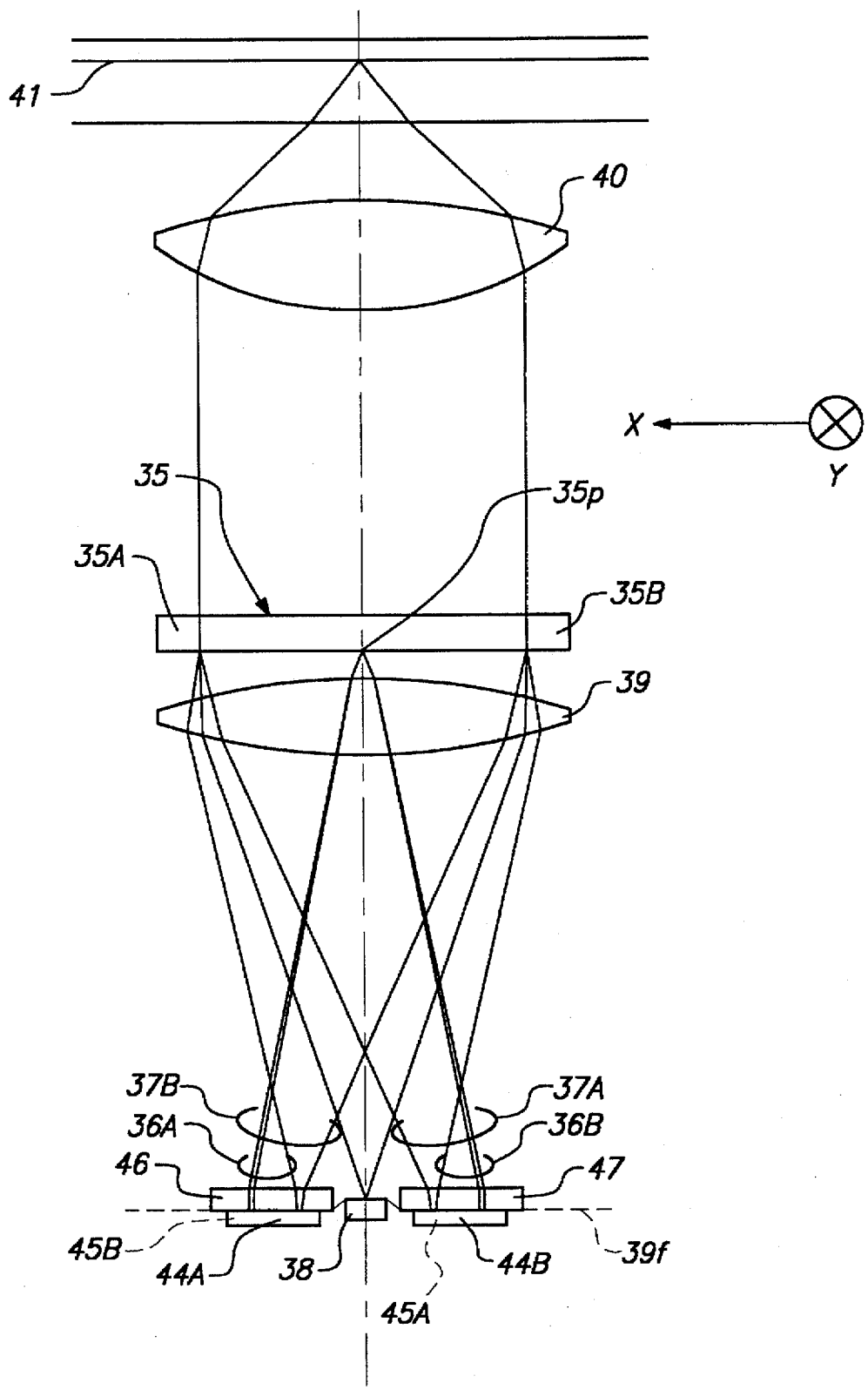
FIG. 10 is a principal cross section of the optical head of the second embodiment.
Figure 11:
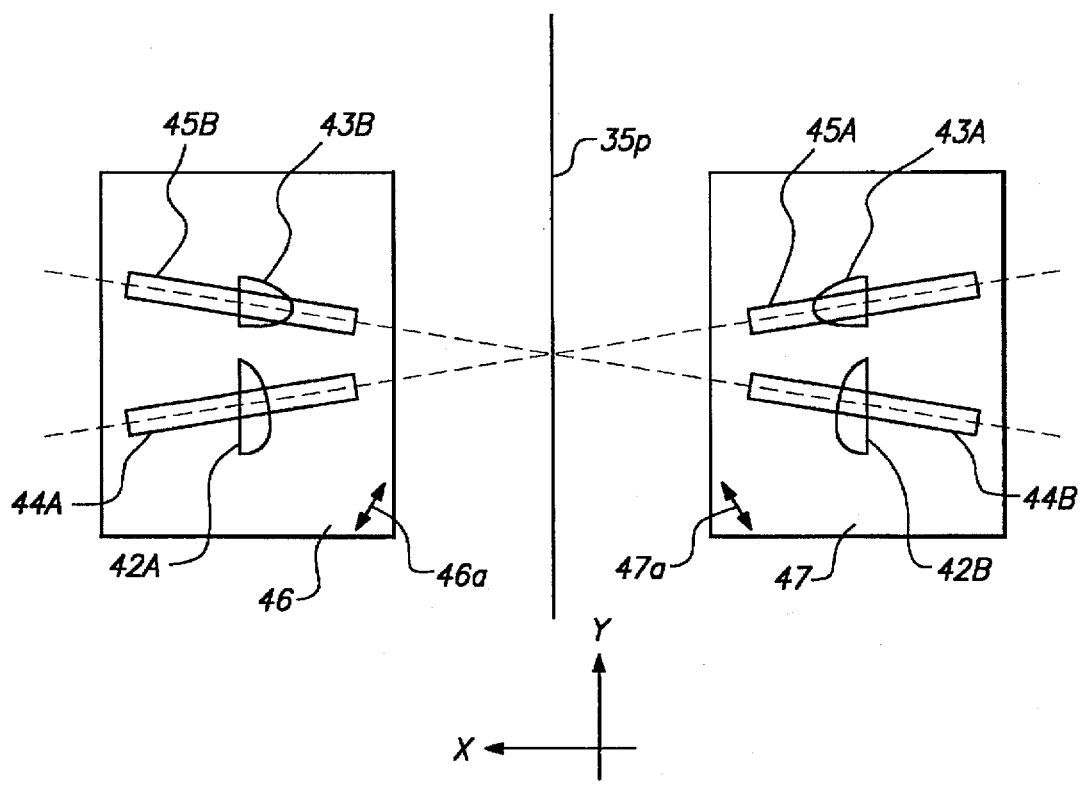
FIG. 11 is a front layout diagram of the photoelectric conversion elements of the optical head in the second embodiment.

FIG. 10 is an explanatory diagram of the optical head of a magneto-optical record/playback apparatus configured using holographic element 35 described above. A divergent beam from semiconductor laser 38 is made a parallel beam by collimator 39 and arrives at holographic element 35 disposed immediately after collimator 39, and the direct advancing 0-order beam passes through objective lens 40 disposed at an appropriate distance and forms a record/playback beam that converges onto recording medium surface 41. Return light of the incident beam reflected off medium surface 41 becomes divergent light traveling back and is made a roughly parallel beam by objective lens 40. The return light enters holographic element 35 again −1-order diffracted beams 36A and 36B and +1-order diffracted beams 37A and 37B are produced through the two areas 35A and 35B of holographic element 35. Holographic element 35 is disposed such that dividing line 35p is parallel to the direction of track grooves on optical recording medium 41. Diffracted beams 36A, 36B, 37A and 37B are converged by collimator 39 and, as shown in FIG. 11, become astigmatic convergent beams that arrive on the straight lines inclined 80 degrees left and right with respect to dividing line 35p of holographic element 35. In order to detect light spots 42A, 42B, 43A and 43B formed by these beams, long rectangular photoelectric conversion elements 44A, 44B, 45A and 45B are all disposed on the same plane with their lengthwise direction parallel to the radial direction. Also, on the front surfaces of photoelectric conversion elements 44A and 45B and photoelectric conversion elements 44B and 45A are disposed polarizing plate analyzers 46 and 47 each extending over both of the associated elements. Their respective axes of transmission 46a and 47a are oriented such that they are suitably rotated the same angle left and right from the polarization axis of the semiconductor laser.

The diffracted beams incident on photoelectric conversion elements 44A, 44B, 45A and 45B become astigmatic convergent beams that all form circles of least confusion on focal plane 39f of collimator 39 as in the case described above. Before and behind the focal point, −1-order spots 42A and 42B projected on photoelectric conversion elements 44A and 44B, respectively and +1-order spots 43A and 43B projected on photoelectric conversion elements 45A and 45B, respectively change their shapes complementarily between a longitudinally long ellipse and a laterally long ellipse. Therefore, by using outputs V1A, V1B, V2A, V2B of photoelectric conversion elements 44A, 44B, 45A and 45B, a focusing error signal can be obtained from the calculation $$(V1A+V1B)-(V2A+V2B).$$

By controlling the focusing actuator for objective lens 40 so that this value keeps constant, the record/playback beam can be continually converged onto the medium surface.

In order to achieve this, there are well-known methods in which a differential signal of the obtained error signal from the target control value is used as the drive signal for the actuator as described above after suitable phase compensation as required is provided.

When the beam formed on recording medium 41 through objective lens 40 shifts from the track groove of recording medium 41, a difference occurs in the amount of reflected light entering areas 35A and 35B on the left and right of dividing line 35p parallel to the track groove. As a result, the sum of the outputs of photoelectric conversion elements 44A and 45A, which receive diffracted beams 36A and 37A, and the sum of the outputs of photoelectric conversion elements 44B, 45B which receive diffracted beams 36B and 37B, become unbalanced. Therefore, a tracking error signal can be obtained from the calculation $$(V1A+V2A)-(V1B+V2B).$$

In other words, if the above value is 0, tracking is normal, but if it is positive or negative, tracking is off. Therefore, by performing tracking control of the objective lens so that this signal is kept at a constant value, the record/playback beam can be continually converged on the track.

In order to achieve this, there are well-known methods in which a differential signal of the obtained error signal from the target value is used as the drive signal for the actuator after suitable phase compensation as required is provided as in the case of the focusing described above.

Polarization analyzers 46 and 47 are provided to detect a magneto-optical signal. The return light of the playback beam, which has a polarizing plane peculiar to the semiconductor laser, is reflected off the medium. Thus, the return light undergoes rotation of the plane of polarization due to the Kerr effect in alternate directions in the erased areas and recording pit areas. Therefore, if Kerr rotation occurs in an erased area in transmission direction 46a of analyzer 46, for example, the intensity of light arriving at photoelectric conversion elements 44A and 45B on the left side will increase and the intensity of light arriving at photoelectric conversion elements 44B and 45A on the right side will decrease. On the other hand, if Kerr rotation occurs in a recording pit area in transmission direction 47a of analyzer 47, the amount of light arriving at photoelectric conversion elements 44A and 45B on the left side will decrease and the amount of light arriving at photoelectric conversion elements 44B and 45A on the right side will increase. Therefore, the magneto-optical recording signal can be reproduced by the calculation $$(V1A+V2B)-(V1B+V2A).$$

When this calculation is used, the differential outputs of both −1-order beams and both +1-order beams are obtained. Therefore, even when the diffraction efficiency differs for −1-order beams and +1-order beams or when defocusing occurs, the fluctuations of common-phase light amount etc., can be effectively removed by taking the advantage of differential detection, thus yielding a good quality playback signal.

Since the light amount itself of the medium-reflected light is modulated in the so-called pre-pit area, the intensities of the light entering photoelectric conversion elements 44A, 44B, 45A and 45B increase or decrease in a similar manner. Therefore, only the calculation $$V1A+V1B+V2A+V2B$$

is necessary to reproduce the pre-pit signal.

As described above, the optical head of this embodiment includes only a few parts and thus is compact and of low cost while it is possible to obtain all of the signals required by a magneto-optical recording apparatus. Also, in addition to being able to use all of the outputs of the four photoelectric conversion elements in every signal calculation, any of the signals can be obtained through different calculations. Therefore, good quality magneto-optical signals, pre-pit signals and various error signals can be obtained without wasting light and with little crosstalk between the signals. Further, even if there are fluctuations in the wavelength of the light source, movement of the diffraction spot has little effect since the photoelectric conversion elements are positioned lengthwise along the direction of diffraction. Moreover, since the two focal positions of the respective astigmatic convergent beams move back and forth nearly the same amount, the differential center does not shift, thus taking the full advantage of the features of the holographic element even when a semiconductor laser or other light source with a readily changeable light wavelength is used. Therefore, an optical storage apparatus which uses the optical head of this embodiment and performs focusing and tracking control as described above can be supported by good quality output signals. The entire apparatus can be made compact because of this highly reliable, high performance, compact head device.

As in the first embodiment, all of photoelectric conversion elements 44A, 44B, 45A and 45B can be placed side by side in the same plane. Therefore, there is no need to strictly control the alignment of the different levels, which greatly simplifies the production of the element, particularly the composite elements including both the photoelectric conversion elements and the semiconductor laser in one package.

In configuring a similar optical head using a conventional linear grating holographic element, four photoelectric conversion elements must be arranged in at least groups of two each on two base substrate 48a and 48b and must be disposed at different levels on either side of the semiconductor laser.

Figure 12A:
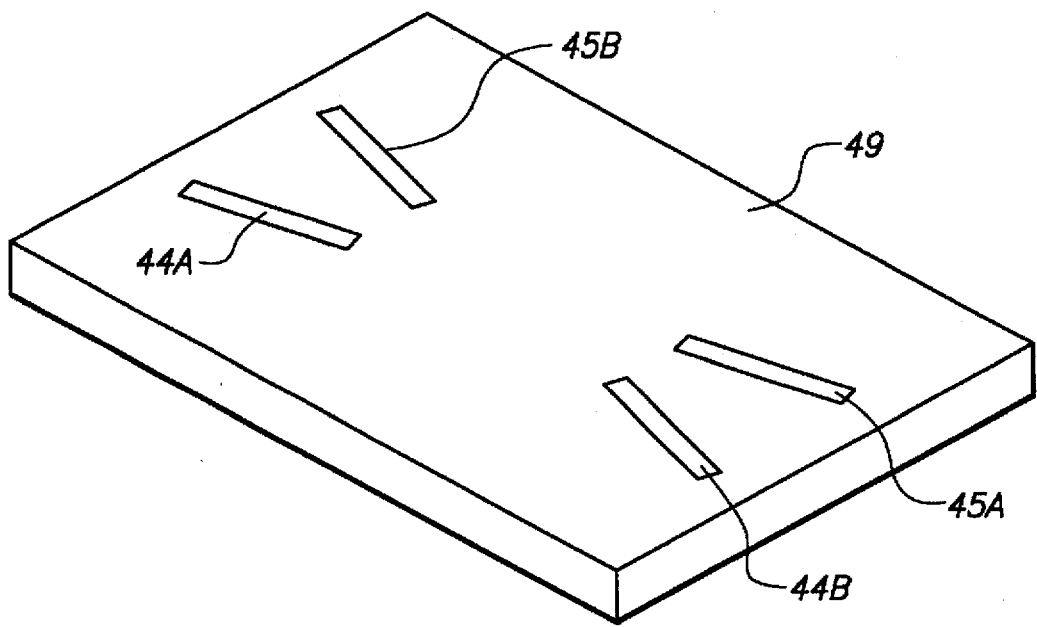
FIGS. 12(a-b) are perspective views of the principal parts of the optical head of the second embodiment.
Figure 12B:
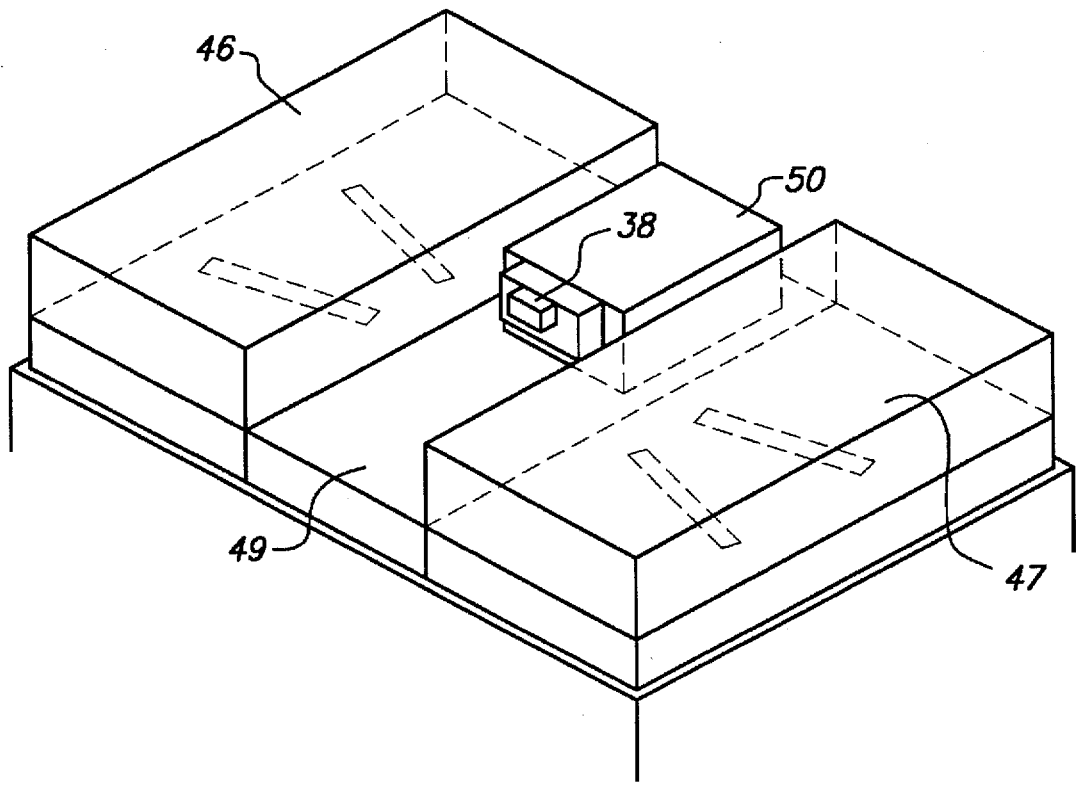
Figure 13A:
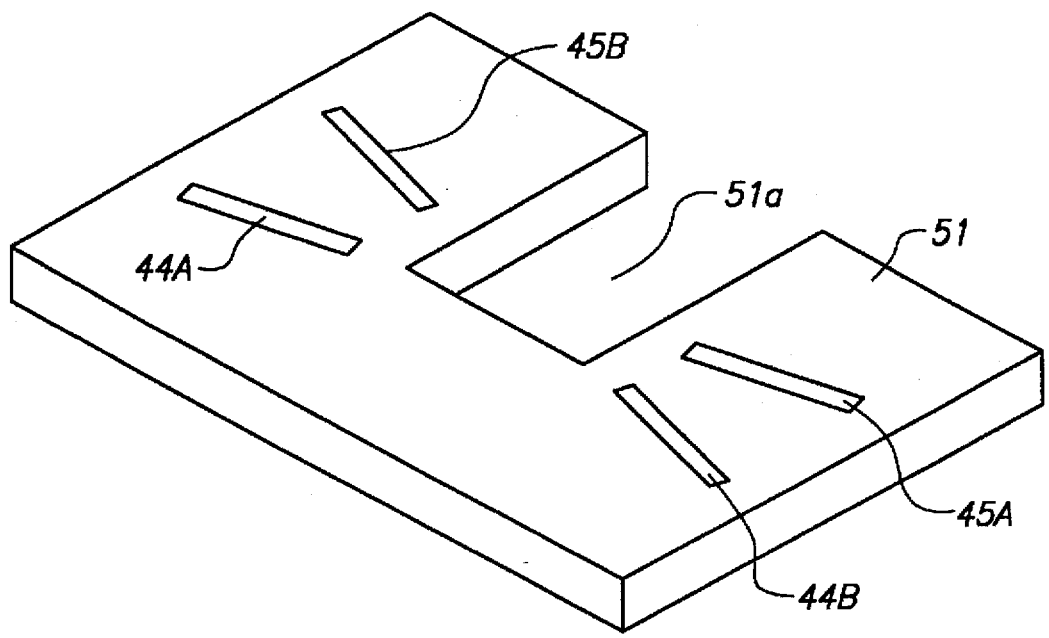
FIG. 13(a-b) are perspective views showing the principal parts of another configuration of the optical head of the second embodiment.
Figure 13B:
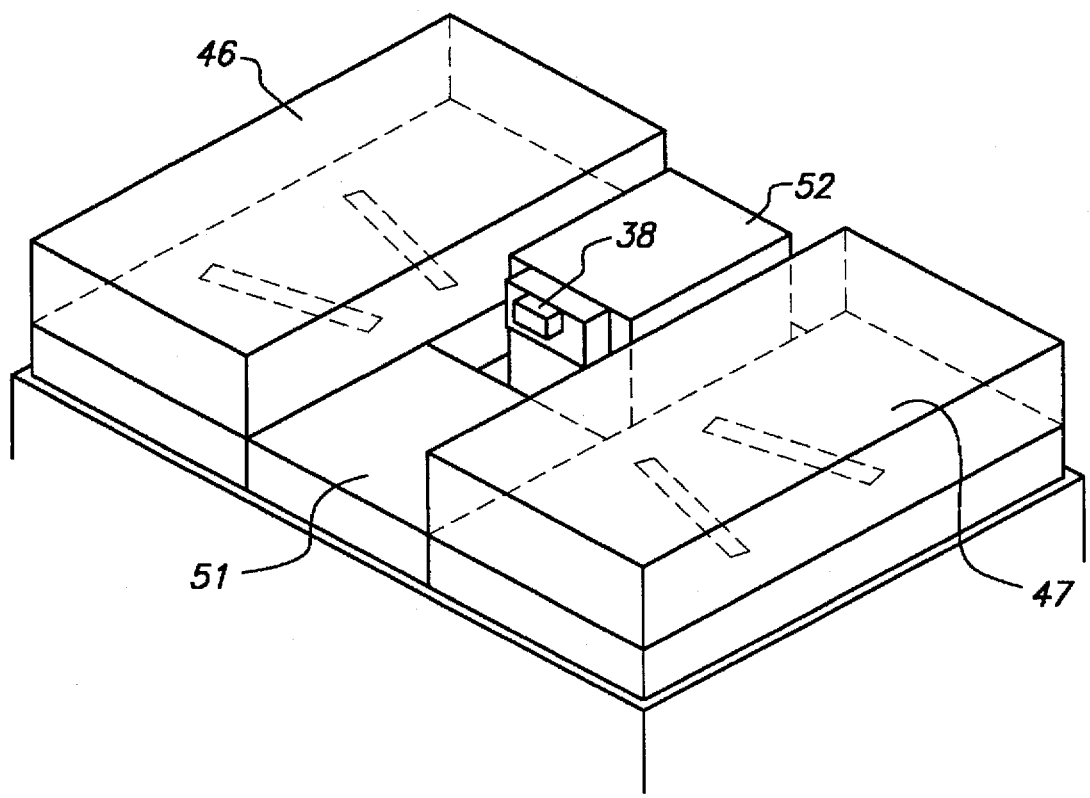
Figure 14:
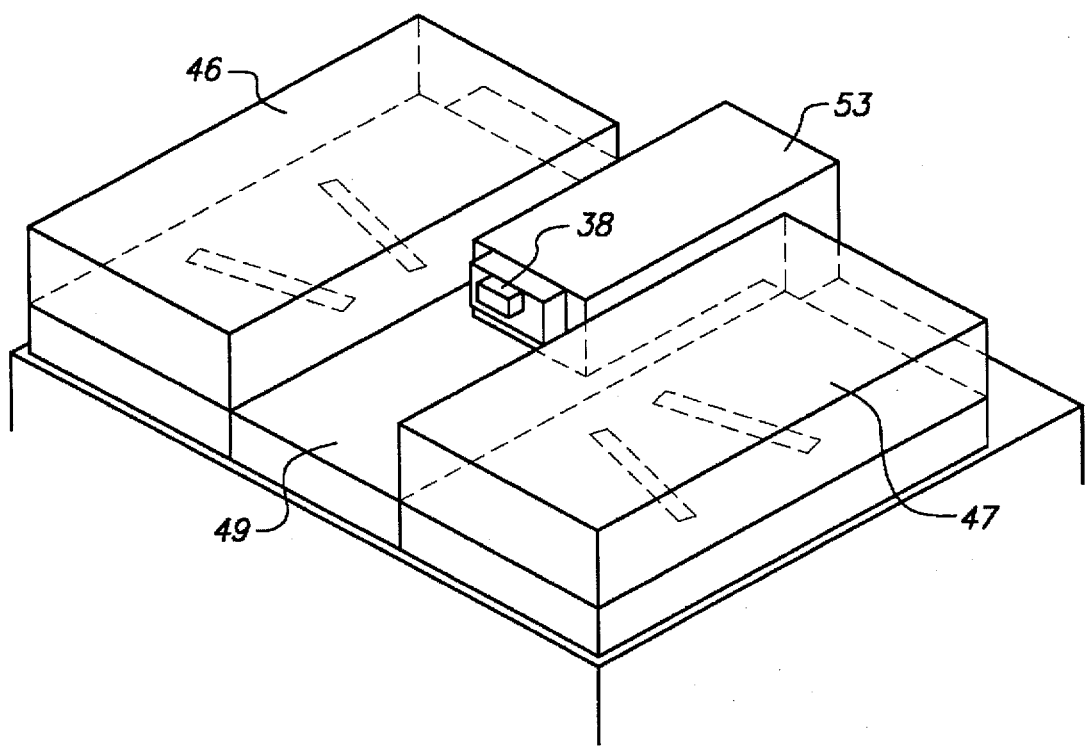
FIG. 14 is a perspective view showing the principal parts of yet another configuration of the optical head of the second embodiment.

In this embodiment, however, the device can be made with four photoelectric conversion elements 44A, 44B, 45A and 45B on one base substrate as shown in FIG. 12. Thus, the dimensional control during assembly is greatly simplified. Semiconductor laser 38 can be disposed on base substrate 49 with heat sink 50. Alternatively, as shown in FIG. 13, a structure can be employed wherein cut-out 51a is provided in the middle of base substrate 51 and heat sink 52 is disposed in the middle of cut-out 51a. Further, heat sink 53 may have a cantilever structure as shown in FIG. 14 and base substrate 49 can be disposed underneath the cantilever. Since it is possible to form all of the photoelectric conversion elements used in detection on the same base substrate in this manner, not only is the dimensional control during assembly easy, but the head amp, signal processing and operational circuits, etc., can be mounted on the same base substrate in a monolithic configuration. Thus, greater compactness and higher performance can be realized.

In the above embodiment, the azimuth of axes of transmission 46a and 47a of analyzers 46 and 47 is appropriately set. By changing this angle, the degree of modulation of the magneto-optical recording signal with respect to the amount of incoming light can be changed. Therefore, for example, it is desirable to adjust the azimuth to an angle that will increase the degree of modulation while suppressing noise, which is proportional to the amount of incoming light. Instead of plate polarizers, other elements having a polarization analyzing function such as a polarizing beam splitter made from a multi-layer film can be used as polarization analyzers 46 and 47.

Also, the angle of rotation of the hyperbolic patterns in areas 35A and 35B of the holographic element and the direction of generating −1-order beams and ±1-order beams through areas 35A and 35B need not be limited to those described above. Further, the combination for obtaining each of the signals need not be restricted to that described above as long as the same functional signals can be obtained.

Although the above explanation relates to a magneto-optical recording device and an optical head for magneto-optical recording, the same method for focus detection, tracking detection and pre-pit detection can be used in other types of optical recording apparatus and optical head devices. Thus, an optical recording apparatus that performs focusing control, tracking control and signal reproduction using this method can be configured.

For example, it can be similarly applied to compact disc players, video disc players and other playback-only optical disc apparatus, dye type or hole-burning type write-once disc apparatus, and phase-change recording type rewritable disc apparatus. Since there are no magneto-optical pits on these discs and all of the pits are reflectivity modulation types, the polarization analyzers in the above configuration are not required and can be eliminated to increase light utilization efficiency.

Third Embodiment

Figure 15:
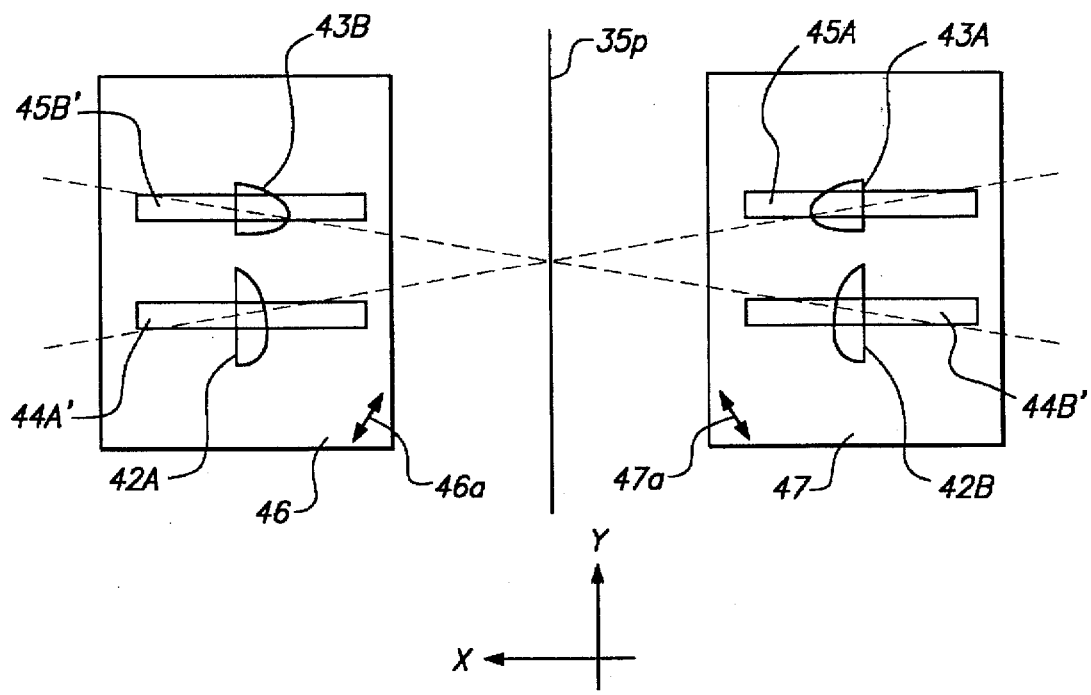
FIG. 15 is a front view of the photoelectric conversion elements of the optical head of the third embodiment.

FIG. 15 shows the third embodiment which is a variation of the second embodiment. The same reference numerals as above indicate the same functional members. In the second embodiment, four photoelectric conversion elements are disposed radially lengthwise along the direction of diffraction separation as shown in FIG. 11. In this embodiment, however, each pair of photoelectric conversion elements 44A', 44B', and 45A', 45B' is disposed with their lengthwise direction parallel to each other as shown in FIG. 15. If they are disposed radially, when there is a shift between the array center of the elements and the light source position, any shift in the spot position is not compensated for by the shape effect of the elements. In this arrangement, however, positional error in the lengthwise direction can be compensated for. If diffracted beams 42A, 42B, 43A and 43B are positioned at an angle near ±80 degrees with respect to the dividing line as described above, the lengthwise direction of photoelectric conversion elements 44A', 44B', 45A', and 45B' are roughly aligned with the lengthwise direction of diffraction. Therefore, manufacturing error in the lengthwise direction can be compensated for without sacrificing, on a practical level, the effect of compensating for spot movement in the event of wavelength fluctuations. Also, when photoelectric conversion elements 44A', 45B' disposed on the left side and photoelectric conversion elements 44B, 45A' disposed on the right side are manufactured separately, their relative positioning in a radial arrangement is difficult. In a parallel arrangement, however, any shift between them can be compensated for by rotating hologram 35 to move the spots, thus increasing the margin of error in manufacture.

Fourth Embodiment

Figure 17:
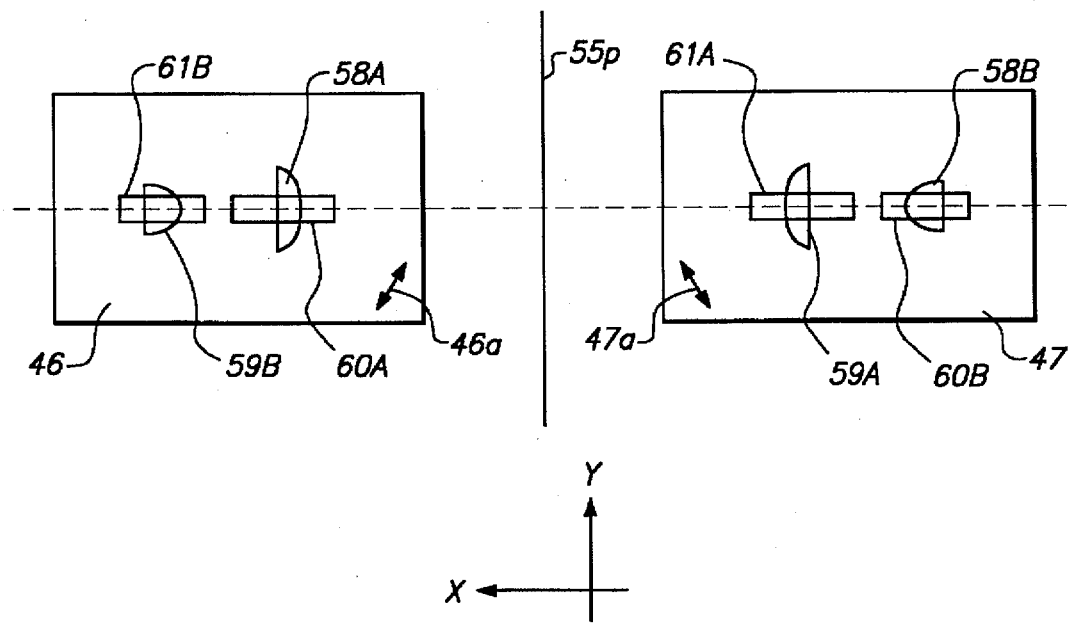
FIG. 17 is a front layout diagram of the photoelectric conversion elements in the optical head of the fourth embodiment.
Figure 16A:
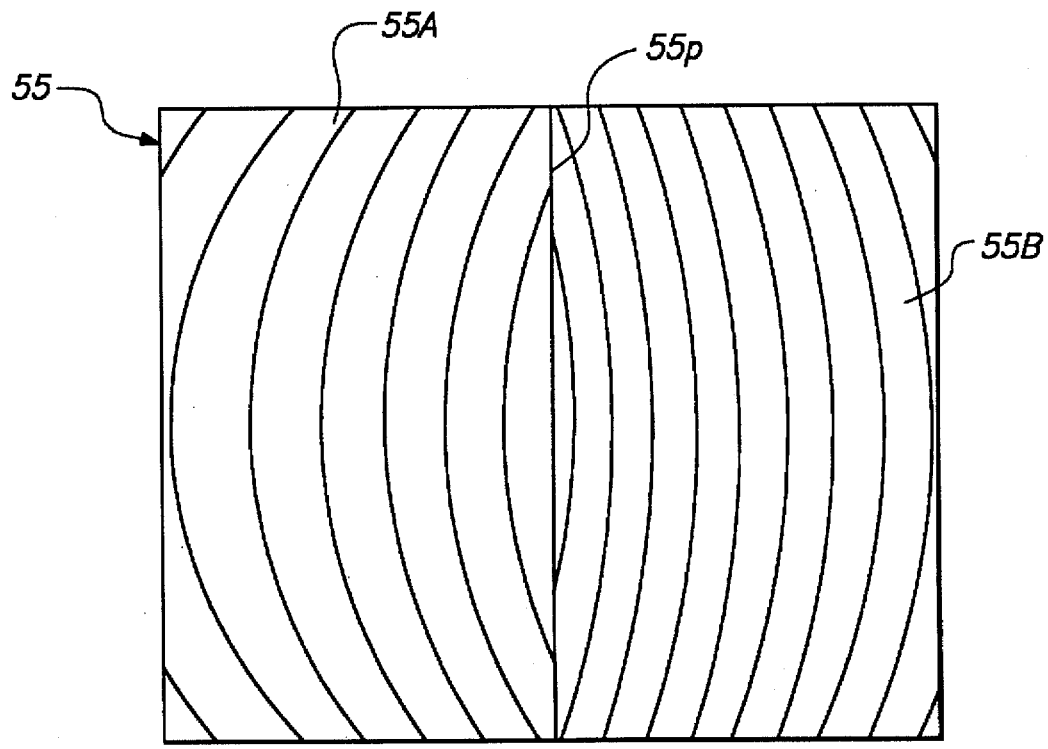
FIGS. 16(a-b) are explanatory diagrams of the holographic element in the optical head of the invention.
Figure 16B:
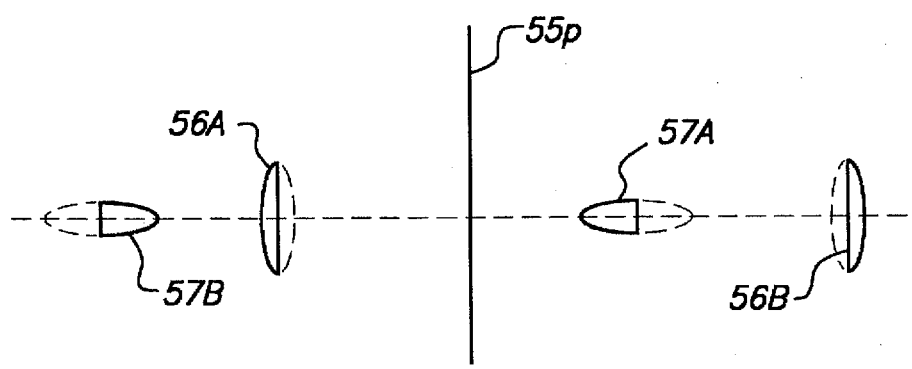

FIGS. 16 and 17 show the forth embodiment which is another variation of the second embodiment. The same reference numerals as above indicate the same functional members. In the second embodiment, the holographic patterns in the areas on the left and right of the dividing line are off-axis patterns by equal amount and the spots are separated by changing the rotation angle of the patterns in left and right areas 35A and 35B. In holographic element 55 of this embodiment, however, the holographic pitch of areas 55A and 55B is changed. In other words, the left and right patterns produce beams of approximately the same focal length ±f, but the amounts they are off axis from the hyperbolic origin are different and the diffraction separation angles are also different. In this case, diffracted beams 56A, 56B, 57A and 57B produced by areas 55A and 55B can be positioned on the same straight line.

For example, if part of the pattern with a large pitch, i.e., pattern with a small degree of off-axis, is rotated 90 degrees and drawn in area 55A and if part of the pattern with a small pitch, i.e., pattern with a large degree of off-axis, is rotated −90 degrees and drawn in opposite area 55B, ±1-order diffraction spots 58B and 59B of area 55B appear on the outside of spots 58A and 59A of area 55A all on a same straight line.

When the diffraction spots are arranged in this manner, the four corresponding photoelectric conversion elements 60A, 60B, 61A and 61B are also arranged linearly. Thus, in addition to being able to completely compensate for spot movement in the event of wavelength fluctuation, the manufacturing tolerance for the direction of diffraction separation can be relaxed.

Fifth Embodiment

Figure 18:
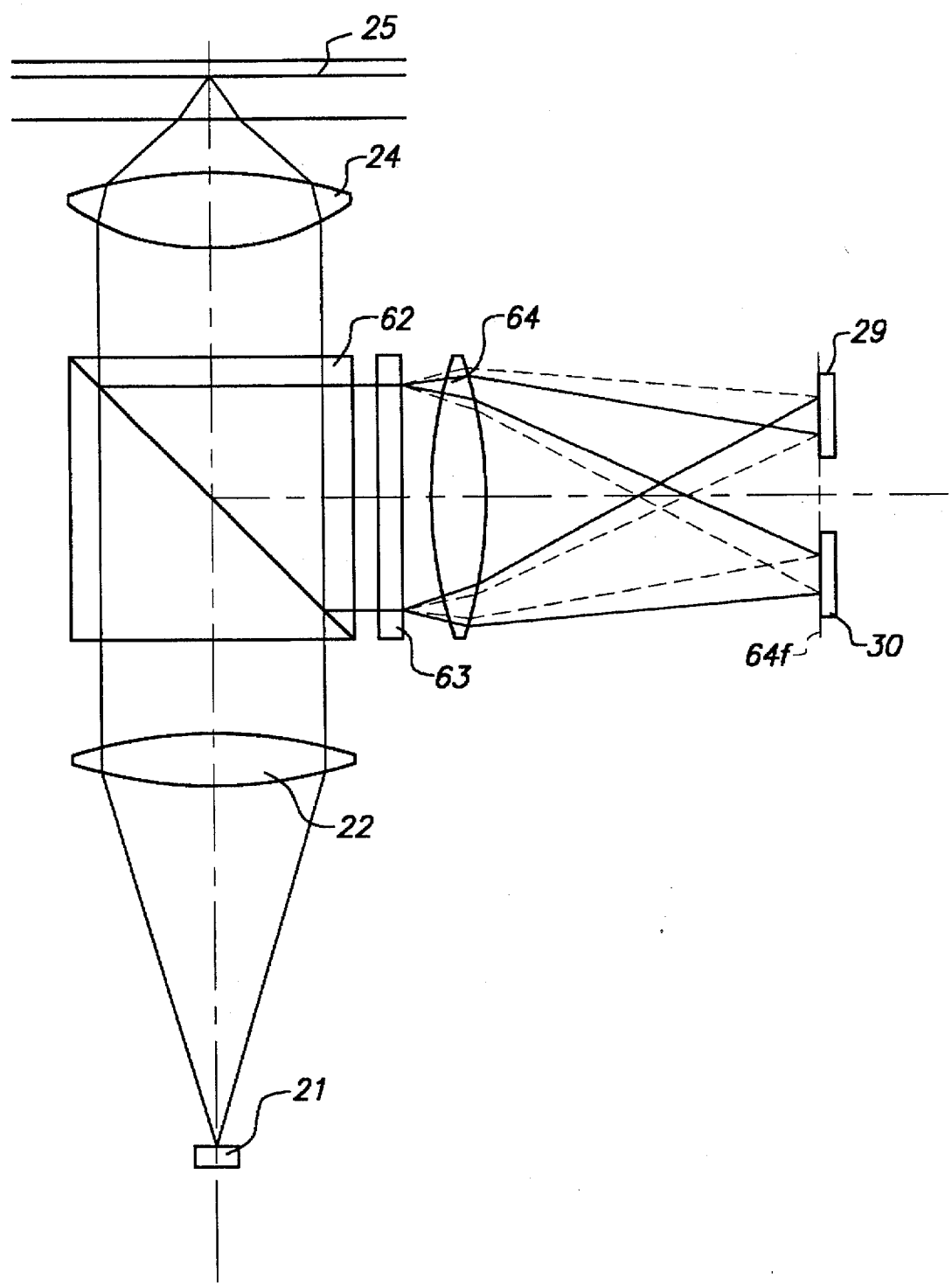
FIG. 18 is a principal cross section of the focus detection mechanism of the fifth embodiment of the invention.

FIG. 18 shows the fifth embodiment of the invention. The same reference numerals used before refer to the same functional members. After divergent light from semiconductor laser 21 is made parallel light by collimator 22, it passes through beam splitter 62 and objective lens 24 and forms the record/playback beam on optical storage medium surface 25. The return light of the incident beam reflected off medium surface 25 becomes divergent light as it travels back, and is made a roughly parallel beam by objective lens 24. The return light arrives at holographic element 63 disposed in the light path bent by beam splitter 62. Here, holographic element 63 has a hyperbolic pattern similar to that in the first embodiment described above. As is known with regular synthesized holograms, it is desirable to establish an appropriate optical modulation rate for one period in order to suppress the transmitted 0-order beam as much as possible and increase the diffraction efficiency of the ±1-order beams. The ±1-order beams emitted in this manner are refracted by condenser 64 disposed immediately after holographic element 63. As in the first embodiment, two photoelectric conversion elements 29 and 30 are disposed on focal plane 64f of condenser 64.

In the above configuration, focus detection can be performed in the same manner as in the second embodiment described above. Also, holographic element 63 can be a split type as in the second embodiment. Furthermore, a similar optical head and optical storage apparatus can be configured using four photoelectric conversion elements. By splitting the optical path in this manner, the luminous efficiency of the 0-order beam can be suppressed and the luminous efficiency of the ±1-order beams can be increased as described above. Thus, the amount of light arriving at photoelectric conversion elements 29 and 30 are increased, which is desirable.

Also, by making the focal length of condenser 64 longer than the focal length of collimator 22, the longitudinal magnification of the optical system on the detection side with respect the medium side can be independently adjusted high. Therefore, the astigmatic difference of the detection beam can be broadened and the sensitivity of the focus error detection can be increased, while good light utilization efficiency of the semiconductor laser is achieved.

Sixth Embodiment

Figure 20:
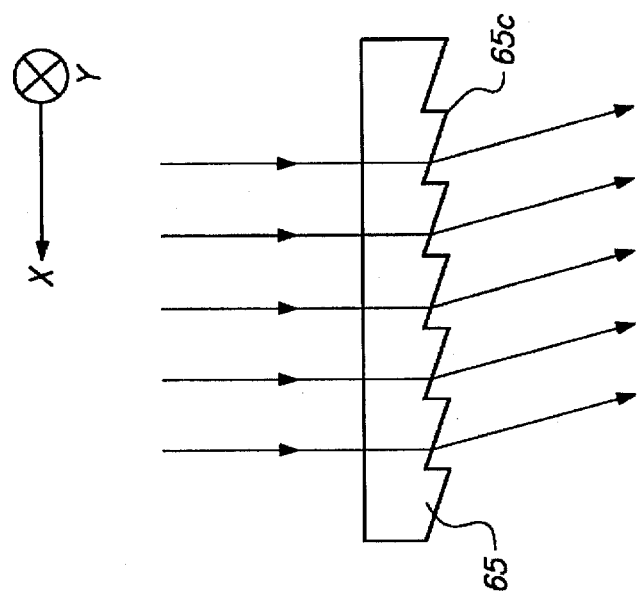
FIG. 20 is a cross section of the holographic element used in the optical head of the sixth embodiment.
Figure 19:
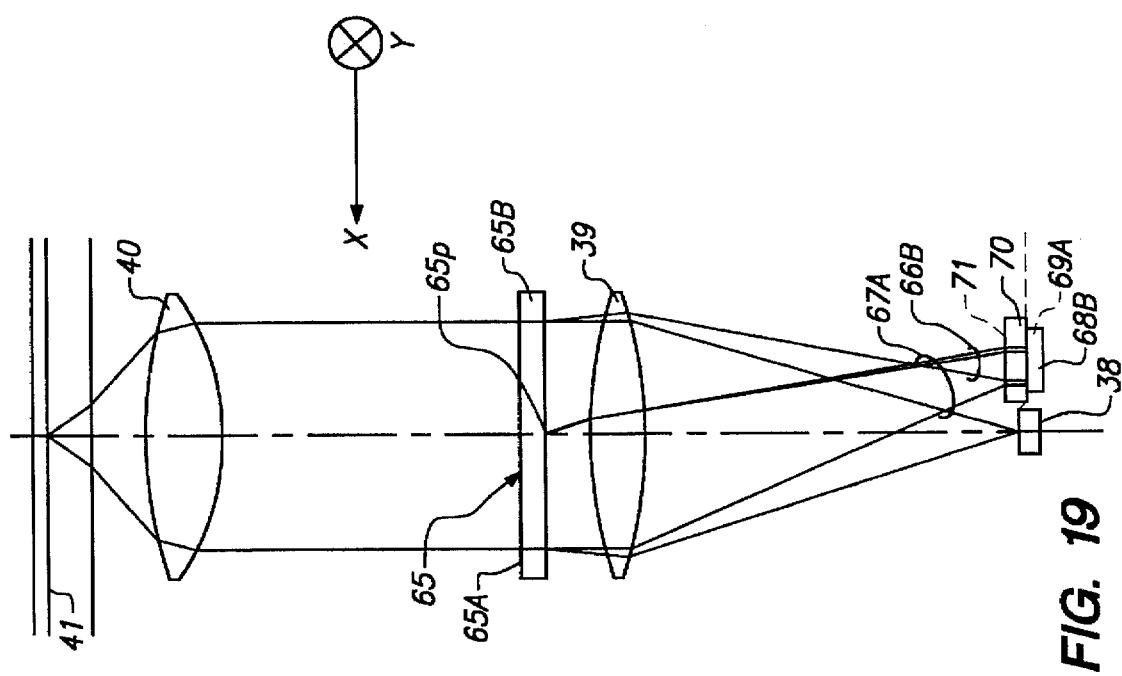
FIG. 19 is a principal cross section of the optical head showing the sixth embodiment of the invention.
Figure 21:
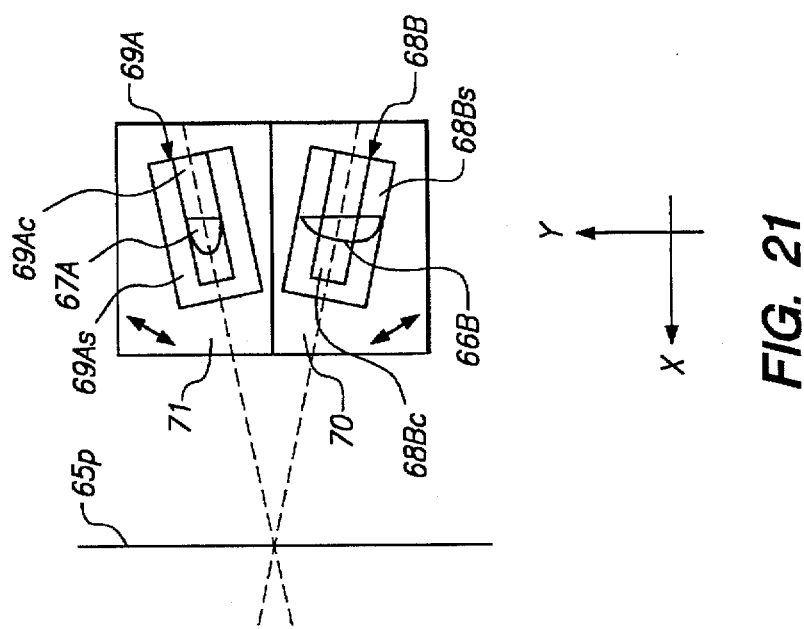
FIG. 21 is a front layout diagram of the photoelectric conversion elements in the optical head of the sixth embodiment.

FIGS. 19 to 21 show the sixth embodiment of the invention. The same reference numerals used before refer to the same functional members. Holographic element 65 disposed in the parallel beam is split holographic element 65 with a pattern similar to that in the second embodiment described above. By applying the blaze-of-grating technique described above, only one of the ±1-order beams, e.g., the one which diffracted to the right side of dividing line 65p, from each of areas 65A and 65B is increased in the intensity. It is known that this kind of blaze-of-grating can be realized, for example, by forming a transmission type holographic element 65 into a left-rising saw-tooth cross section 65c as shown in FIG. 20. The intensity of light diffracted to the left can be made nearly zero by establishing a suitable blaze-of-grating angle.

In this case, the return-path diffracted light to be detected includes only −1-order beam 66B from area 65B and +1-order beam 67A from area 65A. Both beams are diffracted to the right side of dividing line 65p. As shown in FIG. 21, only photoelectric conversion elements 68B and 69A corresponding to beams 66B and 67A are disposed on the same detection plane. Photoelectric conversion elements 68B and 69A are split elements with two areas 68Bs, 69As on each side of middle areas 68Bc and 69Ac as explained above. Their dividing lines are disposed along the respective directions of diffraction. Where the respective photoelectric outputs of areas 68Bc, 68Bs, 69Ac, and 69As are $V1c$, $V1s$, $V2c$, and $V2s$, respectively, the focusing error signal can be obtained by $$(V1c-V1s)-(V2c-V2s)=(V1c+V1s)-(V2c+V2s)$$

and the tracking error signal can be obtained by $$(V1c+V1s)-(V2c+V2s)$$

or $$V1c-V2c.$$

Further, by providing polarization analyzers having axes of transmission with different azimuth angles on each of the front surfaces of photoelectric conversion elements 68B and 69A, the magneto-optical playback signal can be obtained by $$(V1c+V1s)-(V2c+V2s).$$

This calculation is the same as the tracking error signal. However, since the band of the magneto-optical signal is high, both can be isolated by electrically separating the signal bands.

The optical head of this embodiment is configured with only a few parts and requires a photoelectric conversion means only on one side of the light source. Thus, it further simplifies production and makes it more compact and low cost while all the signals required by the magneto-optical recording apparatus can be generated. Also, since all of the outputs of the photoelectric conversion means can be used in every signal calculation, good quality magneto-optical signals, pre-pit signals and various error signals can be obtained without wasting light. Further, even if there are fluctuations in the wavelength of the light source, movement of the diffraction spot has little effect since the photoelectric conversion elements are positioned lengthwise along the direction of diffraction. Moreover, since the two focal positions of the respective astigmatic convergent beams move back and forth by nearly the same amount, the differential center does not shift. Thus it is possible to take the full advantage of the features of the holographic element even when a semiconductor laser or other light source whose emitted light wavelength readily changes is used. Therefore, an optical storage apparatus which uses the optical head device of this embodiment and performs focusing and tracking control as described above is supported by good quality output signals. Also, the entire apparatus can be made compact because of this highly reliable, high performance, compact head device.

Even when holographic element 65 which has undergone blaze-of-grating is used as in this embodiment, the lengthwise directions of photoelectric conversion elements 68B and 69A can be made parallel or the diffraction spots can be separated by changing the pitch of the pattern as in the embodiment described above. Further, it can be similarly used in a case in which the beams are separated in the return path as in the fifth embodiment above.

Seventh Embodiment

Figure 22:
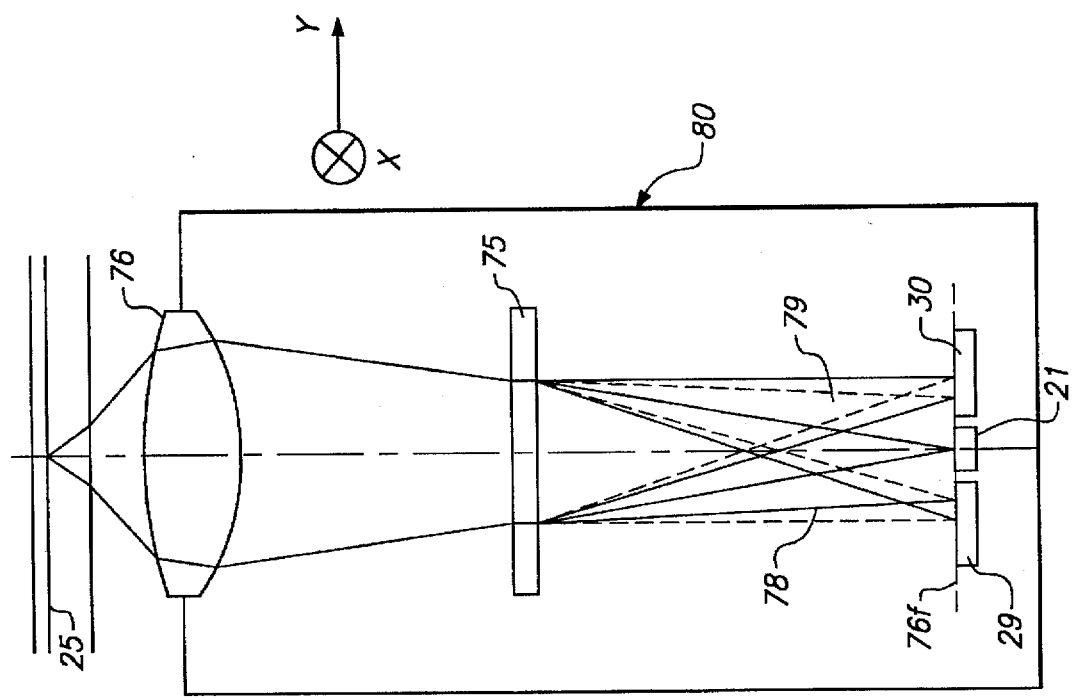
FIG. 22 is a principal cross section of the focus detection mechanism showing the seventh embodiment of the invention.
Figure 23:
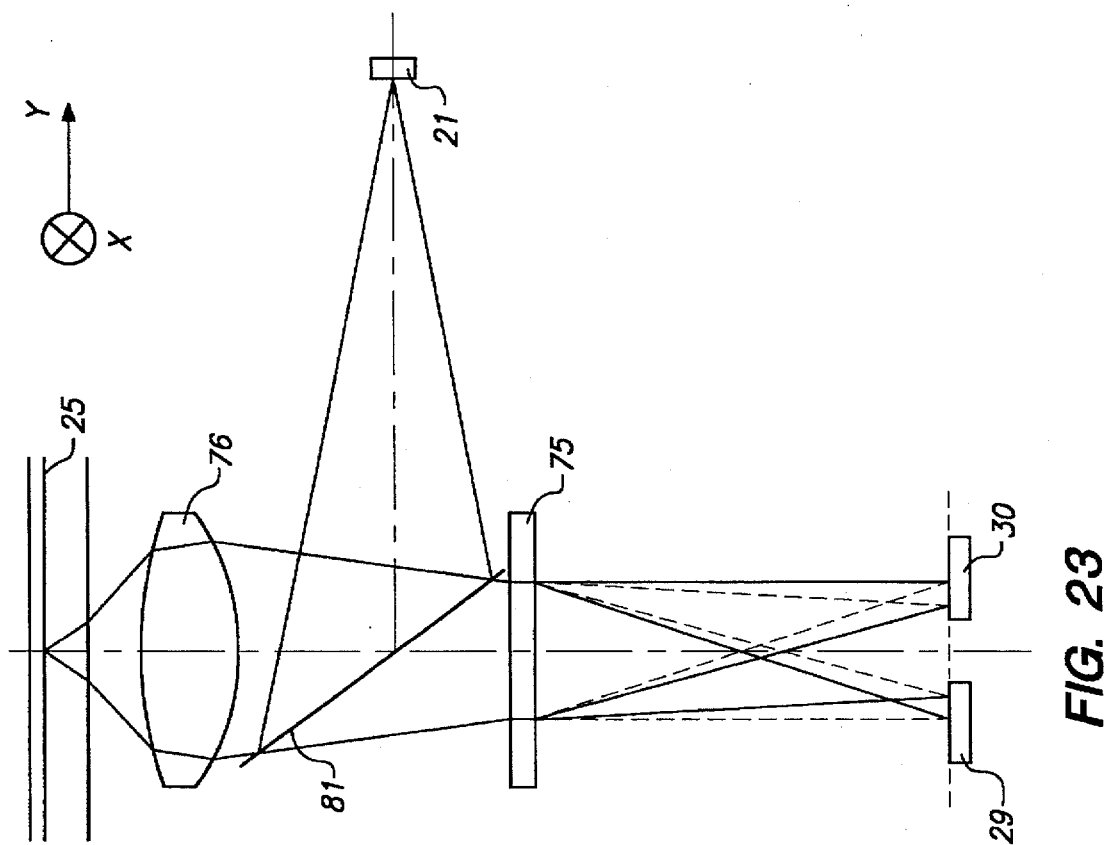
FIG. 23 is a principal cross section of the focus detection mechanism showing another configuration of the seventh embodiment of the invention.

FIGS. 22 and 23 show the seventh embodiment of the invention. In FIG. 22, divergent light from semiconductor laser 21 passes through holographic element 75 and is converged by condenser 76 such that it forms a record/playback beam and converges onto recording medium 25. The reflected light travels back on the light path is refracted by condenser 76 and arrives again at holographic element 75 where 1-order diffracted beams 78 and 79 are produced. Diffracted beams 78 and 79 form two astigmatic convergent beams in nearly the same way as they do above in which they pass through the lens after being diffracted. In the in-focus condition both beams form circles of least confusion on focal plane 76f near the emitting end of semiconductor laser 21.

Before and behind the focal point, the convergence points of the beams move back when medium 25 comes close and move forward when medium 25 moves away. Therefore, focus detection can be performed by disposing the same two photoelectric conversion elements 29 and 30 on the surface of the emitting end of semiconductor laser 21, as in the first embodiment. By moving either condenser 76 or the entire finite system 80 including the members condenser 76, photoelectric conversion elements 29 and 30, etc. by means of an actuator (not shown) so that the focusing error signal obtained at this time keeps at a constant value, the record/playback beam can be continually converged on the medium surface.

In this embodiment, unlike some cases described above, holographic element 75 is disposed in the convergent beam. When the convergent beams are separated by the diffraction of hologram and both ±1-order diffracted beams 78 and 79 are needed, the pattern requires a slight modification from a hyperbola. However, even if the modification is performed, an astigmatic aberration is generated. Such an aberration is common to both beams and unavoidably causes a discrepancy in the astigmatic gaps of the two beams, i.e., −1-order beam 78 with a major astigmatism and +1-order beam 79 with a minor astigmatism. However, in a range in which the diffraction angle of the beam is less than about 15 degrees and the numerical aperture on the detection side is less than about 0.2, the amount of modification required is so small that the pattern shape does not vary much from a hyperbola. In this case, the astigmatic aberration generated with the separation is small and presents little problem in detection. However, in order to improve detection sensitivity, it may be necessary to make the width of photoelectric conversion elements 29 and 30 different from each other, depending on the diameter of the circles of least confusion.

Light diffracted by the holographic element in the forward path can be dissipated out of the light path as useless light by adjusting the distance to the objective lens in the collimating system. Since the distance to condenser 76 is limited in a finite system, it is not easy to obtain sufficient distance. If this distance is not sufficient, a 0-order return beam of the +1-order forward beam will become superposed on the −1-order return beam of the 0-order forward beam and interfere with detection. Therefore, this should be taken into consideration in positioning holographic element 75. Also, since useless return light travels back on a path separate from the optical axis as compared to desired return diffracted beams 78 and 79, the above restriction can be relaxed by providing an aperture stop on holographic element 75.

As shown in FIG. 23, a finite system may include a beam splitter 81 disposed in the convergent beam to separate the light paths of the forward and return beam and cause only the return beam to pass through holographic element 75. In this case, useless forward diffracted light is not produced. Thus, the holographic element can be set to almost completely reduce the efficiency of the 0-order beam and increase the efficiency of the ±1-order beams as in a previous embodiment. It is also desirable to increase the detection sensitivity by inserting a negative lens on the detection side to increase the longitudinal magnification only on the detection side as required.

Further, intentionally providing this detection lens with a suitable astigmatism can be effective in canceling out the astigmatic aberration mentioned above by the hologram separation in the convergent light path.

As a variation of this embodiment, a similar optical head and optical storage apparatus can be configured using four photoelectric conversion elements and a split type holographic element 75 as in the second embodiment. In this case, tracking can also be performed by driving the entire finite system including the members condenser 76, the photoelectric conversion elements, etc.

As described above, the optical head of the finite system can be easily configured in the invention. The head of the finite system requires few adjustments at the time of production and can be made more compact. Furthermore, the head has high reliability after production. Thus, the head contributes to the compactness and reliability of the optical storage apparatus.

Eighth Embodiment

Figure 24:
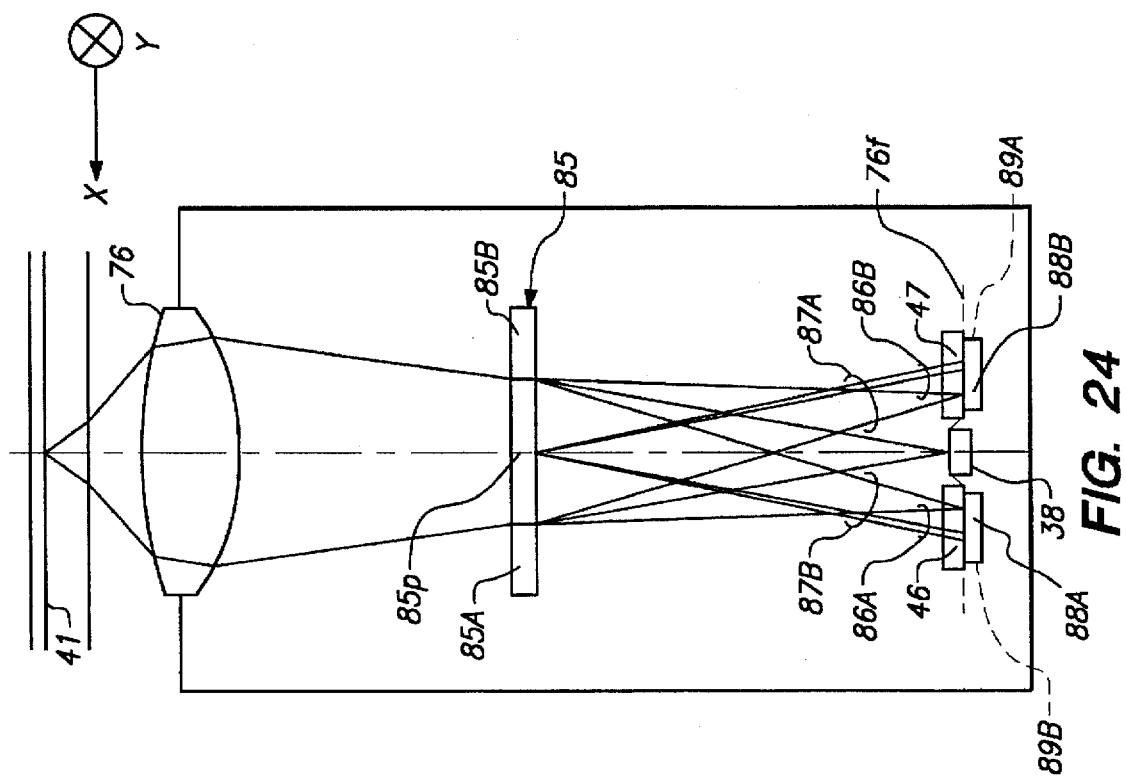
FIG. 24 is a principal cross section of the optical head in the eighth embodiment of the invention.
Figure 26:
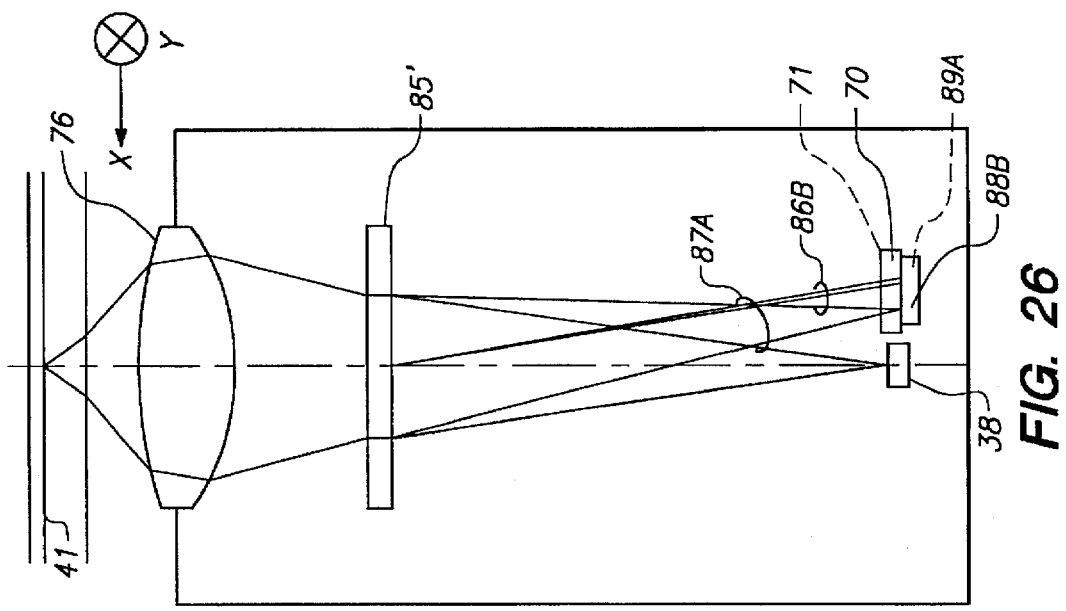
FIG. 26 is a principal cross section of the optical head showing another configuration of the eighth embodiment.
Figure 25:
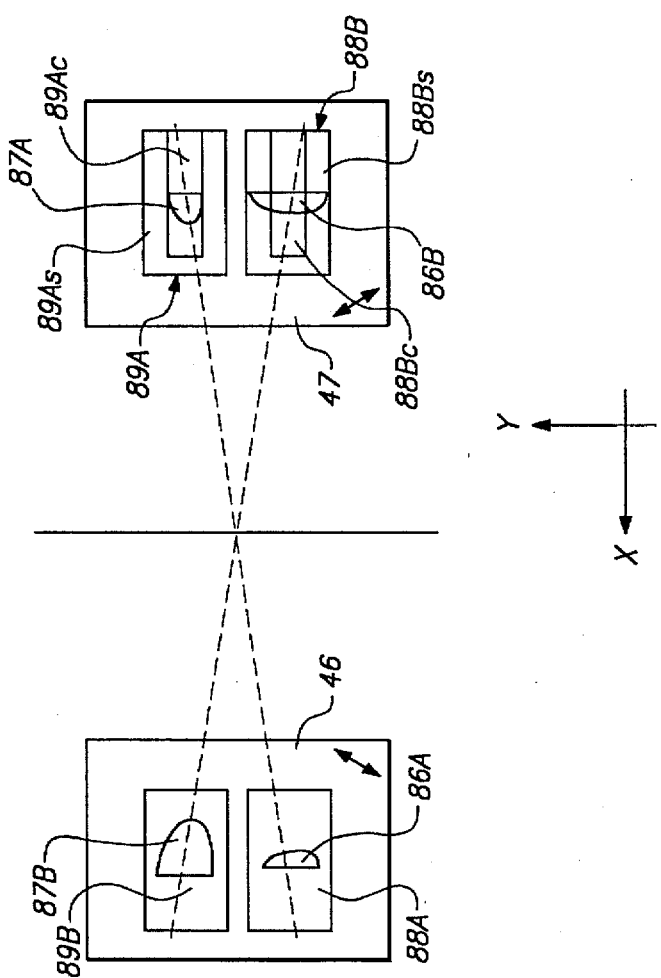
FIG. 25 is a front layout diagram of the photoelectric conversion elements in the optical head of the eighth embodiment.

FIGS. 24 to 26 illustrate the eighth embodiment of the invention and show another embodiment configured with a finite optical system and having a different configuration for removing the effect of the useless astigmatism described above. In FIGS. 24 and 25, holographic element 85 is divided up into left and right areas 85A and 85B by dividing line 85p as in the second embodiment. The spots from the respective areas are divided by rotating the directions of diffraction by 80 degrees, for example, in the clockwise and counterclockwise directions. Both areas 85A and 85B have modified hyperbolic patterns. As described above, the astigmatic gaps of the diffracted beams become large for −1-order beams 86A and 86B and small for +1-order beams 87A and 87B. However, in holographic element 85 of this embodiment, the focal lengths f specific to the respective patterns in areas 85A and 85B are changed such that the astigmatic gap of −1-order beam 86B of area 85B and the astigmatic gap of +1-order beam 87A of area 85A become equal. Diffracted beams 86B and 87A which are given equivalent astigmatic gaps form circles of least confusion of the same diameter on the same plane 76f, and before or behind the focus, the convergence points of the beams move back or forth. Since the respective beams have mutually opposite astigmatic gaps, astigmatic spots that complementarily change between longitudinally long and laterally long ellipses are obtained at the position of the circles of least confusion in the in-focus condition.

Therefore, by obtaining the differential output of two signals detecting the changes in the shape of the two astigmatic spots 86B and 87A, a focusing error signal crossing level zero at the time of in-focus can be obtained. In this embodiment, photoelectric conversion elements 88B and 89A are split elements with peripheral areas 88Bs and 89As on the two sides of middle areas 88Bc and 89Ac as described above. The output difference of the middle areas and the peripheral areas is used as the final output. On the other hand, the other diffracted beams 87B and 86A of the respective areas have slightly different astigmatic gaps. Instead of using these beams in the calculation of the focusing error signal, in this embodiment, they are incident on photoelectric conversion elements 89B and 88A which are sufficiently large to receive all of the light. The calculation for each signal can be written as shown below using the respective outputs V1A, V1Bc, V1Bs, V2Ac, V2As, and V2B of photoelectric conversion elements 88A, 88Bc, 88Bs, 89Ac, 89As and 89B. First, the focusing error signal becomes $$(V1Bc-V1Bs)-(V2Ac-V2As)=(V1Bc+V2As)-(V2Ac+V1Bs)$$

but if this is affected by the tracking error signal, it should be avoided by using $$(V1Bc-V1Bs-V2B)-(V2Ac-V2As-V1A)=(V1Bc+V2As+V1A)-(V2Ac+V1Bs+V2B)$$

The tracking error signal can be obtained by $$V1A-V2B$$

or $$V1A-(V1Bc+V1Bs)$$

$$(V2Ac+V2As)-V2B$$

or $$(V2Ac+V2As)-(V1Bc+V1Bs)$$

$$(V2Ac+V2As+V1A)-(V1Bc+V1Bs+V2B)$$

Further, by disposing polarization analyzer 47 which straddles the two split elements and another polarization analyzer 46 which straddles the other two photoelectric conversion elements as in the second embodiment such that their analyzing angles are inclined, the magneto-optical signal can be obtained by $$(V1Bc+V1Bs+V2Ac+V2As)-(V1A+V2B)$$

If $$(V1A-V2B)$$

is selected in the calculation of the tracking error signal, (V1Bc+V2As) and (V2Ac+V1Bc) can be combined from the beginning, thus making it possible to link them on the photoelectric conversion elements. Further, when the total capacitance of the photoelectric conversion elements concerning the calculation (V1Bc+V2As+V2Ac+V1Bs) of the magneto-optical signal and that concerning the calculation (V1A+V2B) are set equal to each other, common noise can be efficiently removed by differential detection.

As described above, in this embodiment, although an astigmatism-generating hologram is placed in the convergent beam, the effect of undesirable astigmatic aberration can be removed in the detection stage. In addition, since both ±1-order diffracted beams, which change alternately with each other, are used, good focus detection is possible. Furthermore, changes in the diffraction angle due to wavelength fluctuation are absorbed by the long photodetection means, and the differential center does not shift. Thus, it can take the full advantage of the features of the hologram even when a semiconductor laser or other light source whose emitted wavelength readily changes is used.

Here is explained a type of embodiment in which the spots are separated by changing the direction of diffraction on the left and right sides of dividing line 85p. However, a similar type of configuration that separates spots by changing the diffraction angle on the left and right sides as described above is also possible.

Also, as in the seventh embodiment above, providing an aperture stop on holographic element 85 can be effective in relaxing the restriction on the position at which holographic element 85 is disposed.

It is also possible to perform blaze-of-grating on holographic element 85 in this embodiment as in the sixth embodiment. In FIG. 26, when blaze-of-grating is used to increase the intensities of beams 86B and 87A whose astigmatic gaps are made the same by holographic element 85, the intensities of the other two diffracted beams (not shown) can be made to nearly zero. Thus, only two sets of split photoelectric conversion elements 88B and 89A need be used. Where the outputs of photoelectric conversion elements 88Bc, 88Bs, 89Ac, and 89As are V1c, V1s, V2c, V2s respectively, the focusing error signal can be obtained by $$(V1c+V2s)-(V2c+V1s)$$

and the tracking error signal can be obtained by $$(V1c+V1s)-(V2c+V2s)$$

Further, by providing analyzer 70 and 71 having different angles of polarization analysis on each of the front surfaces of photoelectric conversion elements 88B and 89A, the magneto-optical playback signal can be obtained by $$(V1c+V1s)-(V2c+V2s)$$

This is the same calculation as the tracking error signal. However, since the band of the magneto-optical signal is high, both can be isolated by electrically separating the signal bands.

The optical head device described above requires few adjustments at the time of production because of the finite system and can be made more compact. It has high reliability after production and requires that photoelectric conversion elements 88B and 89A be disposed on only one side of the light source, thus further simplifying production.

When blaze-of-grating is used like this, almost no useless forward diffracted light, which superposes on the return diffracted light, is generated. Thus, any restriction on the positioning of holographic element 85' is eliminated, and holographic element 85' can be positioned sufficiently far from the light source. Since the light source and photoelectric conversion elements can be separated while the angle of diffraction of the hologram is kept small, production is further simplified.

Since both ±1-order diffracted beams, which change complementarily with each other, are used in this case as well, good focus detection is possible. Changes in the diffraction angle due to wavelength fluctuation are compensated for by the long photodetection means. Furthermore, the differential center does not shift. It can take the full advantage of the features of the hologram even when a semiconductor laser or other light source whose emitted wavelength easily changes is used.

Ninth Embodiment

Figure 27:
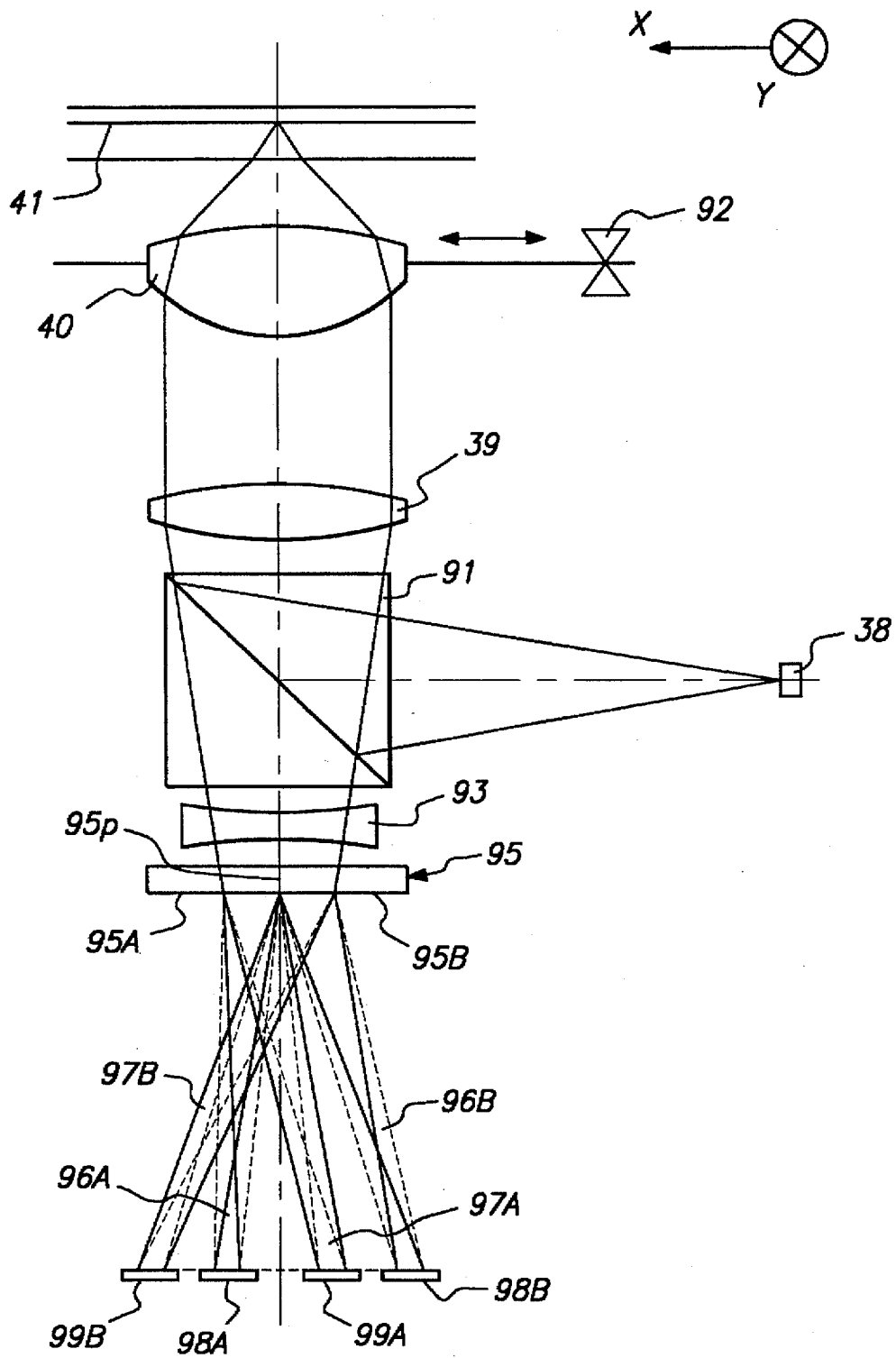
FIG. 27 is a principal cross section of the optical head in the ninth embodiment of the invention.

FIG. 27 shows the ninth embodiment of the invention. The same reference numerals as used before refer to the same functional members. The divergent parallel beam from semiconductor laser 38 is bent by a beam splitter 91 and is made a parallel beam by collimator 39. Objective 40 is disposed in the parallel beam. The light passing through objective lens 40 forms the record/playback beam which converges onto storage medium surface 41. Objective 40 can move in a direction perpendicular to the track groove of recording medium 41. The beam is moved onto the desired track by moving objective lens 40. There is also lens shift sensor 92 which detects the amount of movement of objective lens 40. The light reflected off the medium surface is made roughly parallel light again by objective lens 40 and travels back along the light path. Then it is made convergent light by collimator 39 and enters beam splitter 91. The advancing beam passes through the following negative detection lens 93 and enters holographic element 95. Holographic element 95 is divided into the two left and right areas 95A and 95B by dividing line 95p as in the fourth embodiment. The spots of the respective areas are separated by changing the diffraction separation angles in the left and right areas. Both areas have modified hyperbolic patterns and generate the four astigmatic convergent beams 96A, 96B, 97A, and 97B.

To receive these beams, four long photoelectric conversion elements 98A, 98B, 99A, and 99B are provided with their lengthwise direction in the same direction as the diffraction direction on a straight line as in the fourth embodiment. Split elements having peripheral areas for effectively utilizing the amount of light are used as required. Where the outputs of the respective photoelectric conversion elements are V1A, V1B, V2A, and V2B, the focusing error signal can be obtained by $$(V1A+V1B)-(V2A+V2B).$$

The record/playback beam can be continually converged onto medium surface 41 by driving objective lens 40 in the focusing direction so that this value is constant. Also, the tracking error signal can be obtained by $$(V1A+V2A)-(V1B+V2B).$$

This can be made constant by moving objective lens 40 transversely across the tracks. However, the error signal includes an offset depending on the position of objective lens 40 in this configuration. The lens shift sensor is provided to correct this offset. By multiplying the lens shift sensor output by an appropriate coefficient and adding this to the tracking error signal, the offset can be canceled. Therefore, by performing tracking servo of objective lens 40 so that this corrected tracking error signal remains constant, the record/playback beam can be continually converged on the track.

Since tracking of only light weight objective lens 40 is performed in this embodiment, it is ideal for cases requiring high speed tracking.

Of course, by providing polarization analyzers as in the previous case, detection of a magneto-optical signal is possible. Also, negative detection lens 93 provided on the detection side can increase the sensitivity of focus detection by increasing the longitudinal magnification. Also, intentionally giving detection lens 93 a suitable astigmatism can be effective in canceling out the undesirable astigmatic aberration generated by holographic element 95 in the convergent light.

In this case, as well, all the essential signals can be obtained as described above with the device being compact and of low cost. Also, in addition to being able to use all of the outputs of the four photoelectric conversion elements in every signal calculation, any of the signals can be obtained through different calculations. Therefore, good quality signals can be obtained without wasting light and with little crosstalk between signals. Further, even if there are fluctuations in the wavelength of the light source, movement of the diffraction spot has little effect and the differential center of focus detection does not shift. Thus, it is possible to take the full advantage of the features of the holographic element even when a semiconductor laser or other light source whose emitted light wavelength readily changes is used. Therefore, an optical storage apparatus which uses the optical head device of this embodiment is supported by good quality output signals, and the entire apparatus can be made compact because of this highly reliable, high performance, compact head device.

Tenth Embodiment

Figure 29:
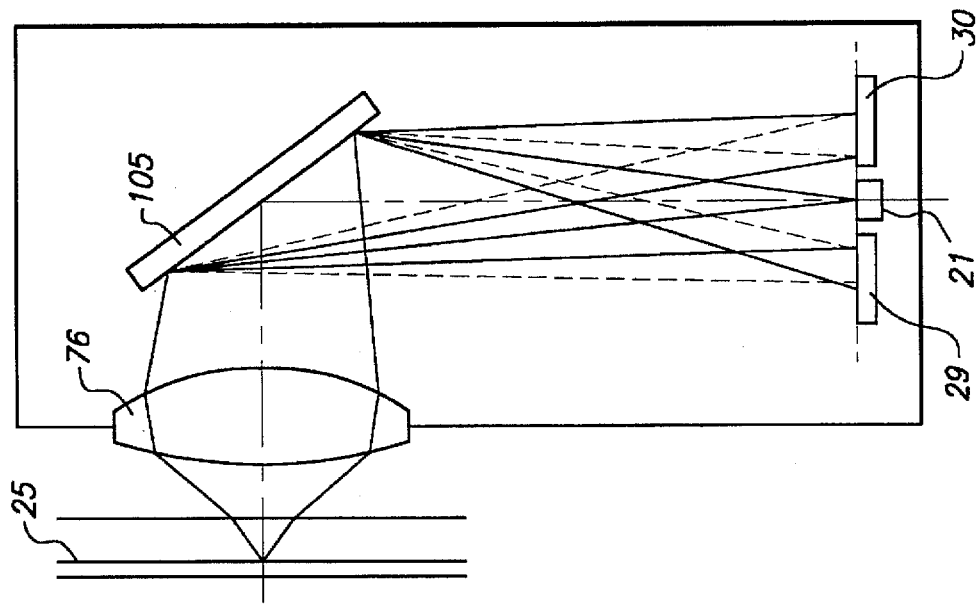
FIG. 29 is a principal cross section of the focus detection mechanism in another configuration of the tenth embodiment.
Figure 28:
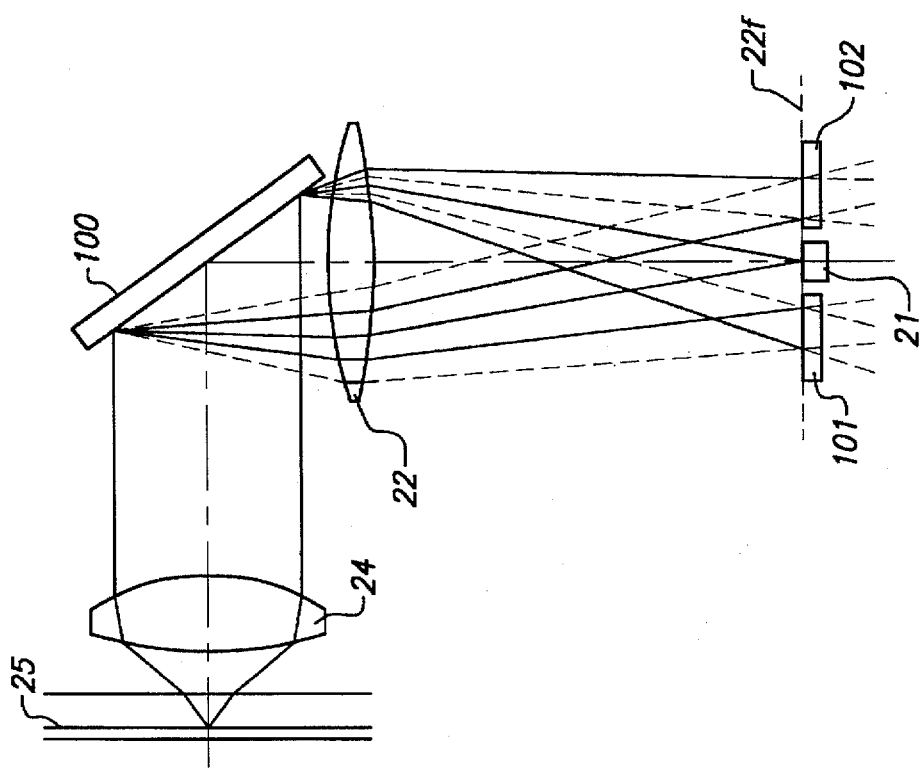
FIG. 28 is a principal cross section of the focus detection mechanism of the tenth embodiment of the invention.

FIGS. 28 and 29 show the tenth embodiment of the invention. In FIG. 28, the divergent beam from semiconductor laser 21 is made parallel by collimator 22 and arrives at reflective holographic element 100 which is disposed diagonally. In the forward path, only the regularly reflected 0-order beam passes through objective lens 24 disposed at an appropriate distance and forms the record/playback beam which converges onto the surface of optical storage medium 25. The return light of the incident beam reflected off medium surface 25 becomes divergent light as it travels back and is made a roughly parallel beam by objective lens 24. The return light arrives again at holographic element 100 and is diffracted. The diffracted light is refracted by collimator 22 and is received by photoelectric conversion elements 101 and 102 disposed on the same plane near the focal plane 22f of collimator 22.

Here, holographic element 100 is modified by a one-dimensional correction in the inclination direction of the reflection surface from the above hyperbolic pattern, whereby patterns can be worked out to generate astigmatic convergent beams like several of the holographic elements described above. The focus detection can be performed as in the embodiment described above by this configuration. Of course, it is also possible to use a split type photoelectric conversion element to configure an optical head and optical storage apparatus as in the second embodiment.

When the principal diffraction direction of the beam is inclined in a case in which holographic element 100 is positioned diagonally as in this embodiment, it is possible, as in the case in which the holographic element is disposed in the convergent beam path, that the astigmatic gap of one diffracted beam become large while that of the other beam become small, or that the distances of the two diffracted beams from the center become different from each other due to the difference in the angles of the ±1-order diffracted beams from the regularly reflected beam. For this reason, instead of using the depicted configuration, it is more desirable to make the diffraction direction of the beams by reflective holographic element 100 perpendicular to the inclination direction.

When a split type holographic element 100 is used, the above problem of different astigmatic gaps can be avoided by employing a blaze-of-grating in the reflective holographic element 100 and using one beam from each of the areas. In such a case, good focus detection becomes possible even when the diffraction direction matches the inclination direction.

Further, even if a reflective type holographic element 105 is used in a finite optical system such as in FIG. 29, the same detection system can be configured by performing one-dimensional correction as in this embodiment. In this case, as well, it is more desirable to make the principal diffraction direction of the beams perpendicular to the inclination direction. It may also effectively cancel out changes in the astigmatic gaps due to the convergent light path by means of the changes in the astigmatic gaps due to the diagonal arrangement. Also, the effect obtained by the blaze-of-grating technique is the same as described above.

Eleventh Embodiment

Figure 30A:
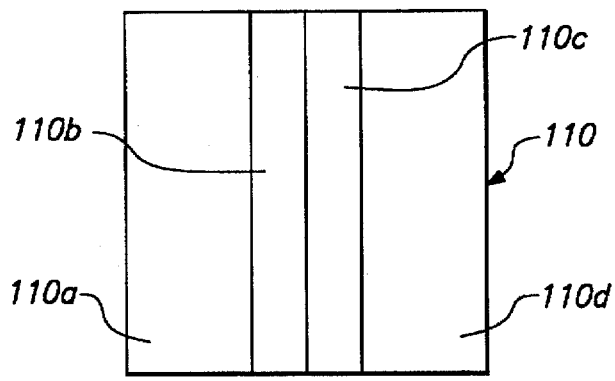
FIGS. 30(a–c) are front views of the photoelectric conversion elements of the optical head of the eleventh embodiment of the invention.
Figure 30B:
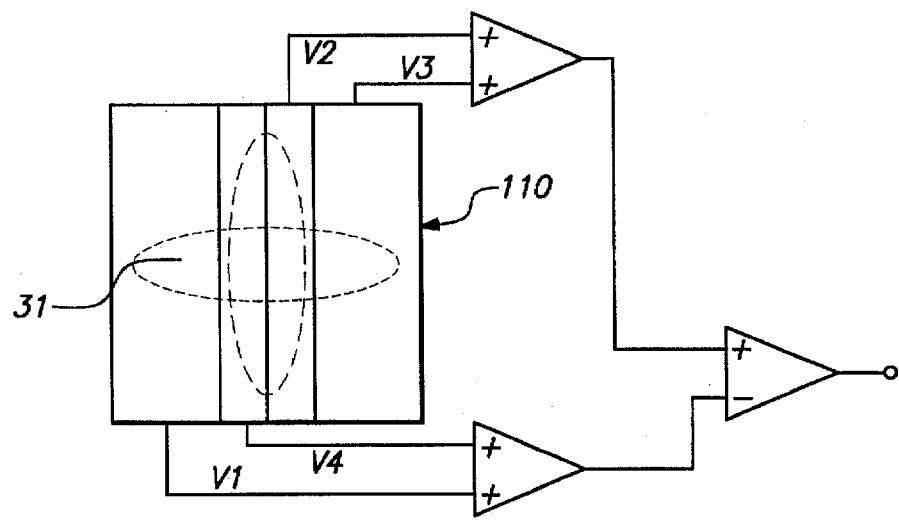

FIG. 30 shows the eleventh embodiment of the invention. Photoelectric conversion element 29 or photoelectric conversion element 30 in the same configuration as the first embodiment is quartered element 110 comprising the four rectangular light-receiving areas 110a, 110b, 110c, and 110d as shown in FIG. 30(a).

When the medium moves away from the focusing position in this embodiment, the shape of projected light spot 31 changes from a longitudinally long ellipse to a laterally long ellipse, thus facilitating detection of focusing error by calculating $$(V2+V3)-(V1+V4)$$

where V1, V2, V3, V4 are the respective outputs of the four receiving areas.

Figure 30C:
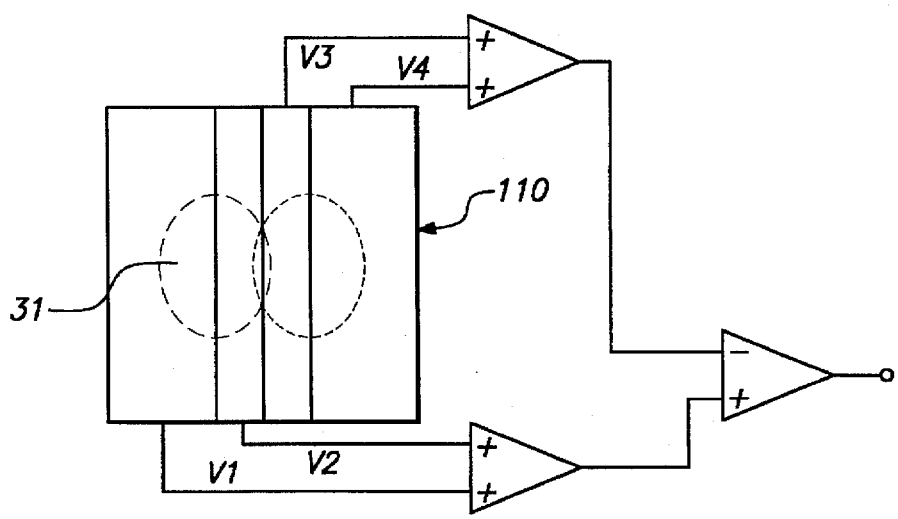
Figure 32:
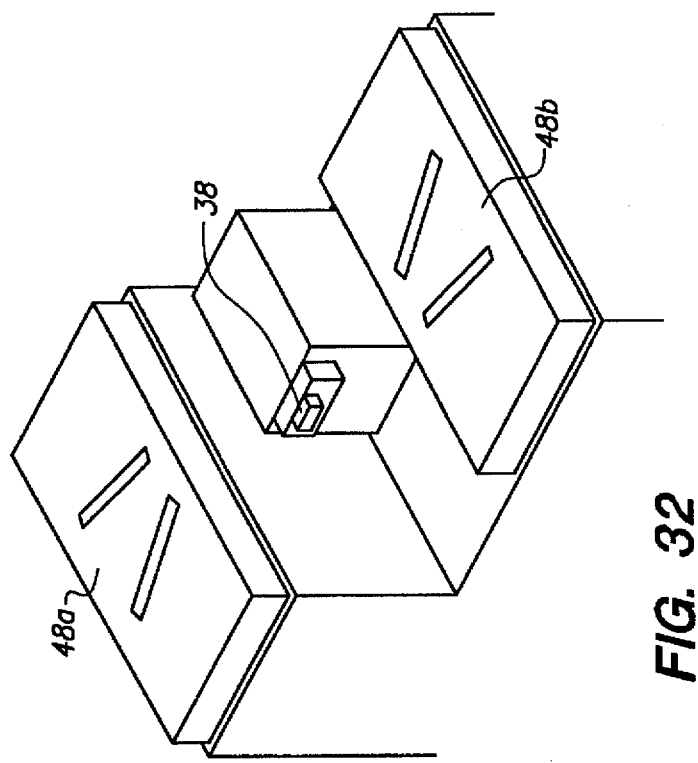
FIG. 32 is a perspective view showing the principal parts of the prior art optical head which used a diffraction grating.
Figure 31:
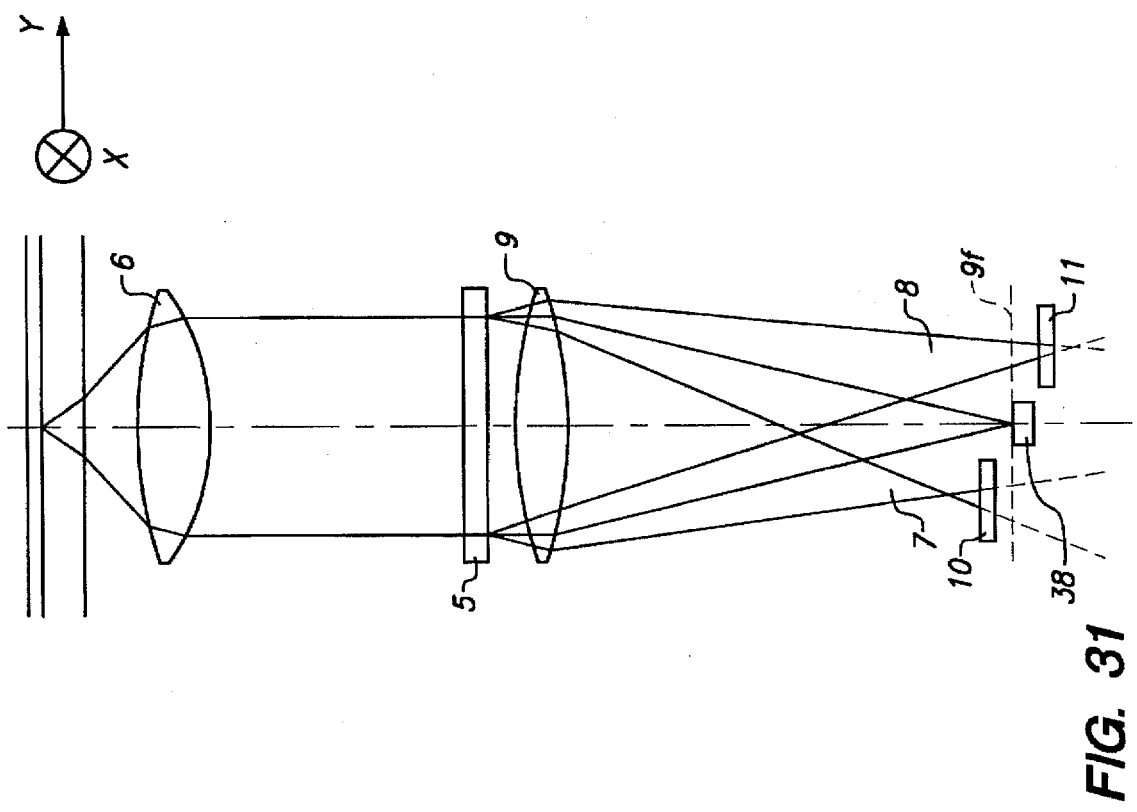
FIG. 31 is a principal cross section of a prior art focus detection mechanism which used a diffraction grating.

By making the division direction of quartered element 110 parallel to the track direction of the medium, the position of projected light spot 31 moves left or right as shown in FIG. 30(c) when the beam moves off the track. Therefore, the tracking error can be obtained by calculating $$(V1+V2)-(V3+V4).$$

One quartered element 110 may be used in place of either photoelectric conversion element 29 or 30, or two may be used.

In the first to the eleventh embodiments, depending on the modifications to the equations, addition and subtraction can be reversed in the calculations, but this is within the scope of the invention.

As explained above, the focus detection mechanism of the invention includes two photoelectric conversion elements for obtaining differential output on the same plane, thus facilitating higher dimensional accuracy in production. Further, since the differential center does not shift with wavelength fluctuations, it is possible to take the full advantage of the features of the holographic element even when a semiconductor laser or other light source whose emitted light wavelength readily changes is used. Also, since the optical head of the invention is configured with only a few parts, the signals required by an optical storage apparatus can be obtained efficiently while compactness and low cost are achieved. Also, good quality playback signals, pre-pit signals and various error signals can be obtained. The optical storage apparatus of the invention which uses the optical head device described above can be realized in a simple, compact, high performance, low cost configuration. As described above, the invention offers significant advantages in related fields and has high potential for application.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. An optical head for performing recording and/or playback on an optical medium disposed on a target plane, comprising:

a light source for emitting a light beam onto a surface of said medium along an optical axis, the light beam being reflected off said medium as a return light;

a focus detection mechanism for detecting focusing of the light beam on said surface, said mechanism comprising:

converging means for focusing the light beam on said surface and for directing the return light reflected off said surface, holographic means including first and second areas and a boundary line in between the first and second areas, each area having a periodic light modulatory pattern for diffracting the return light directed by said converging means to produce two astigmatic diffracted beams, each periodic light modulatory pattern including a group of curves substantially following hyperbolic patterns oriented about an origin, wherein said holographic means is arranged with respect to said light source such that the optical axis of the light beam is offset from the origin, means for receiving the astigmatic diffracted beams, said receiving means including four photodetection means disposed on a substantially same detection plane for detecting the respective astigmatic diffracted beams to produce corresponding output signals, and means for processing the output signals to detect focusing of the light beam on said surface; and actuating means, responsive to said processing means, for adjusting the position of at least said converging means in accordance with the output of said processing means so that the light beam is continually focused on said surface.

2. The optical head of claim 1, wherein the dividing line of said holographic means is parallel to the direction of track grooves on the medium; wherein the return light enters said two areas of said holographic means to become four astigmatic convergent beams that arrive on the respective photodetection means in such a manner that two astigmatic convergent beams are arranged substantially along a first straight line inclined a first predetermined angle relative to the dividing line of said holographic means and the other two astigmatic convergent beams are arranged substantially along a second straight line inclined a second predetermined angle relative to the dividing line.

3. The optical head of claim 1, wherein each photodetection means is arranged with its lengthwise direction being substantially parallel to the diffraction direction such that each photodetection means receives and detects a respective astigmatic convergent beam.

4. The optical head of claim 1, further comprising two polarization analyzers each mounted over two of said photodetection means disposed on one side of the dividing line of said holographic means, said polarization analyzers each having a transmission axis oriented at a different angle relative to the polarization axis of said light source for detecting a magneto-optical signal.

5. The optical head of claim 4,
wherein two photodetection means disposed on a first side of the dividing line generate a first output signal and a fourth output signal respectively, and two photodetection means disposed on a second side of the dividing line generate a second output signal and a third output signal, respectively;

wherein said processing means generates a focusing error signal, a tracking error signal and a magneto-optical signal from the four output signals of said four photodetection means; and wherein the focusing signal is generated by subtracting the sum of the first and second output signals from the sum of the third and fourth output signals, the tracking signal is generated by subtracting the sum of the first and third output signals from the sum of the second and fourth output signals, and the magneto-optical signal is generated by subtracting the sum of the first and fourth output signals from the sum of the second and third output signals.

6. The optical head of claim 1, wherein the group of curves on said first area of said holographic means has a first pitch and is rotated a first predetermined angle relative to the dividing line of said holographic means, and the group of curves on said second area of said holographic means has a second pitch smaller than said first pitch.

7. The optical head of claim 1, wherein the group of curves on said first area of said holographic means has a first pitch and is rotated a first predetermined angle relative to the dividing line of said holographic means, and the group of curves on said second area of said holographic means is rotated a second predetermined angle relative to the dividing line of said holographic means.

8. The optical head of claim 1, wherein the return light enters said two areas of said holographic means to become four astigmatic convergent beams that arrive on the respective photodetection means in such a manner that the four astigmatic convergent beams are arranged substantially along a straight line.

9. The optical head of claim 8, wherein said four photodetection means are linearly arranged with their lengthwise direction parallel to the straight line.

10. The optical head of claim 1, wherein the detection plane is conjugate with the target plane.

11. The optical head of claim 1, wherein said receiving means further includes means disposed between said holographic means and said four photodetection means for converging the astigmatic diffracted beams.

12. The optical head of claim 1, wherein said four photodetection means are arranged in two groups, each group including two photodetection means arranged with their lengthwise direction parallel to each other for detecting respective astigmatic diffracted beams.

13. The optical head of claim 1, wherein the four astigmatic convergent beams form circles of least confusion on the respective photodetection means when the light beam on the medium surface is in in-focus condition.

14. The optical head of claim 1, further comprising a heat sink on which the laser means is mounted and a base substrate on which said pairs of photodetection means and said sink are mounted.

15. The optical head of claim 1, wherein the return light enters said two areas of said holographic means to become four astigmatic convergent beams that arrive on the respective photodetection means in such a manner that two astigmatic convergent beams are arranged substantially along a first straight line inclined a first predetermined angle relative to the dividing line of said holographic means and the other two astigmatic convergent beams are arranged substantially along a second straight line inclined a second predetermined angle relative to the dividing line.

16. The optical head of claim 15, wherein said four photodetection means are arranged in two groups, each group including two photodetection means arranged with their lengthwise direction parallel to each other for detecting respective astigmatic diffracted beams.

17. The optical head of claim 15, further comprising a heat sink on which the laser means is mounted and a base substrate on which said pairs of photodetection means and said sink are mounted.

18. The optical head of claim 15, further comprising two polarization analyzers each mounted over two photodetection means disposed on one side of the dividing line with their transmission axes being inclined a predetermined angle relative to the polarization axis of said light source for detecting a magneto-optical signal.

19. The optical head of claim 18, wherein two photodetection means disposed on a first side of the dividing line generate a first output signal and a fourth output signal respectively, and two photodetection means disposed on a second side of the dividing line generate a second output signal and a third output signal, respectively;

wherein said processing means generates a focusing error signal, a tracking error signal and a magneto-optical signal from the four output signals of said four photodetection means; and wherein the focusing signal is generated by subtracting the sum of the first and second output signals from the sum of the third and fourth output signals, the tracking signal is generated by subtracting the sum of the first and third output signals from the sum of the second and fourth output signals, and the magneto-optical signal is generated by subtracting the sum of the first and fourth output signals from the sum of the second and third output signals.

20. The optical head of claim 1, wherein the detection plane is conjugate with the target plane.

21. The optical head of claim 1, wherein each photodetection means is arranged with its lengthwise direction being substantially parallel to the diffraction direction such that each photodetection means receives and detects a respective astigmatic convergent beam.

22. The optical head of claim 1, wherein said receiving means further includes means disposed between said holographic means and said four photodetection means for converging the astigmatic diffracted beams.

23. The optical head of claim 1, wherein the four astigmatic convergent beams form circles of least confusion on the respective photodetection means when the light beam on the medium surface is in infocus condition.

24. The optical head of claim 1 wherein the group of curves on each area is rotated about the origin by a predetermined angle with respect to the boundary line.

25. An optical head for performing recording and/or playback on an optical medium disposed on a target plane, comprising:

a light source for emitting a light beam onto a surface of said medium along an optical axis, the light beam being reflected off said medium as a return light;

a focus detection mechanism for detecting focusing of the light beam on said surface, said mechanism comprising:

a converging lens for focusing the light beam on said surface along a light path and for directing the return light reflected off said surface, a holographic element disposed along the light path and including first and second areas and a boundary line in between the first and second areas, each area having a periodic light modulatory pattern for diffracting the return light directed by said converging lens to produce two astigmatic diffracted beams, the periodic light modulatory pattern including a group of curves substantially following hyperbolic patterns oriented about an origin wherein said holographic element is arranged with respect to said light source such that the optical axis of the light beam is offset from the origin, four photodetectors disposed around the light path on a substantially same detection plane for detecting the respective astigmatic diffracted beams to produce corresponding output signals, and means for processing the output signals to detect focusing of the light beam on said surface; and actuating means, responsive to said processing means, for adjusting the position of at least said converging lens in accordance with the output of said processing means so that the light beam is continually focused on said surface.

26. The optical head of claim 25, wherein the dividing line of said holographic element is parallel to the direction of track grooves on the medium; wherein the return light enters said two areas of said holographic element to become four astigmatic convergent beams that arrive on the respective photodetectors in such a manner that two astigmatic convergent beams are arranged substantially along a first straight line inclined a first predetermined angle relative to the dividing line of said holographic element and the other two astigmatic convergent beams are arranged substantially along a second straight line inclined a second predetermined angle relative to the dividing line.

27. The optical head of claim 25, wherein each photodetector is arranged with its lengthwise direction being substantially parallel to the diffraction direction such that each photodetector receives and detects a respective astigmatic convergent beam.

28. The optical head of claim 25, further comprising two polarization analyzers each mounted over two of said photodetectors disposed on one side of the dividing line of said holographic element, said polarization analyzers each having a transmission axis oriented at a different angle relative to the polarization axis of said light source for detecting a magneto-optical signal.

29. The optical head of claim 28, wherein two photodetectors disposed on a first side of the dividing line generate a first output signal and a fourth output signal respectively, and two photodetectors disposed on a second side of the dividing line generate a second output signal and a third output signal, respectively;

wherein said processing means generates a focusing error signal, a tracking error signal and a magneto-optical signal from the four output signals of said four photodetectors; and wherein the focusing signal is generated by subtracting the sum of the first and second output signals from the sum of the third and fourth output signals, the tracking signal is generated by subtracting the sum of the first and third output signals from the sum of the second and fourth output signals, and the magneto-optical signal is generated by subtracting the sum of the first and fourth output signals from the sum of the second and third output signals.

30. The optical head of claim 25, wherein the group of curves on said first area of said holographic element has a first pitch and is rotated a first predetermined angle relative to the dividing line of said holographic element, and the group of curves on said second area of said holographic element has a second pitch smaller than said first pitch.

31. The optical head of claim 25, wherein the group of curves on said first area of said holographic element has a first pitch and is rotated a first predetermined angle relative to the dividing line of said holographic element, and the group of curves on said second area of said holographic element is rotated a second predetermined angle relative to the dividing line of said holographic element.

32. The optical head of claim 25, wherein the return light enters said two areas of said holographic element to become four astigmatic convergent beams that arrive on the respective photodetectors in such a manner that the four astigmatic convergent beams are arranged substantially along a straight line.

33. The optical head of claim 32, wherein said four photodetectors are linearly arranged with their lengthwise direction parallel to the straight line.

34. The optical head of claim 25, wherein said four photodetectors are arranged in two groups, each group including two photodetectors arranged with their lengthwise direction parallel to each other for detecting respective astigmatic diffracted beams.

35. The optical head of claim 25, wherein the four astigmatic convergent beams form circles of least confusion on the respective photodetectors when the light beam on the medium surface is in in-focus condition.

36. The optical head of claim 25, further comprising a heat sink on which the laser means is mounted and a base substrate on which said pairs of photodetectors and said sink are mounted.

37. The optical head of claim 25 wherein the group of curves on each area is rotated about the origin by a predetermined angle with respect to the boundary line.

* * * * *